(12) United States Patent
Flynn

(10) Patent No.: US 12,072,411 B2
(45) Date of Patent: Aug. 27, 2024

(54) SYSTEM FOR ACCURATE GEOSPATIAL LOCATION AND TIME TRANSFER USING RADIO TRANSMISSIONS WITHOUT SATELLITE SIGNALS

(71) Applicant: James Albert Flynn, Chatsworth, CA (US)

(72) Inventor: James Albert Flynn, Chatsworth, CA (US)

(73) Assignee: James Albert Flynn, Chatsworth (CA)

( * ) Notice: Subject to any disclaimer, the term of this patent is extended or adjusted under 35 U.S.C. 154(b) by 0 days.

(21) Appl. No.: 17/973,758

(22) Filed: Oct. 26, 2022

(65) Prior Publication Data

US 2023/0048916 A1 Feb. 16, 2023

Related U.S. Application Data

(63) Continuation-in-part of application No. 17/511,126, filed on Oct. 26, 2021.

(60) Provisional application No. 63/105,844, filed on Oct. 26, 2020.

(51) Int. Cl.
*G01S 13/46* (2006.01)

(52) U.S. Cl.
CPC ......... *G01S 13/46* (2013.01); *G01S 2013/468* (2013.01)

(58) Field of Classification Search
CPC .. G01S 13/46; G01S 19/215; G01S 2013/466; G01S 2013/468; G01S 5/0036; G01S 5/0205; G01S 5/10; H04W 64/006
USPC ....................................... 455/456.1; 342/450
See application file for complete search history.

(56) References Cited

U.S. PATENT DOCUMENTS

| 2,513,320 | A | * | 7/1950 | Hawkins ................ G01S 1/304 |
| | | | | 342/395 |
| 5,689,270 | A | * | 11/1997 | Kelley ................ H04B 7/1855 |
| | | | | 342/357.31 |
| 6,492,945 | B2 | | 12/2002 | Counselman, III et al. |
| 7,155,240 | B2 | | 12/2006 | Atkinson et al. |
| 8,018,383 | B1 | | 9/2011 | Schantz et al. |
| 8,055,288 | B2 | | 11/2011 | Ladd et al. |
| 8,072,220 | B2 | | 12/2011 | Dolgin et al. |

(Continued)

FOREIGN PATENT DOCUMENTS

WO 2012065184 A2 5/2012

*Primary Examiner* — Don N Vo
(74) *Attorney, Agent, or Firm* — Troutman Pepper Hamilton Sander LLP; James E. Schutz; Haden R. Marrs

(57) ABSTRACT

A system for accurate geospatial location and time transfer using radio transmissions without satellite signals. A position and timing measurement system uses standard uncorrelated radio broadcast signals, each of which transmits on an assigned frequency from a known position defined in latitude and longitude, and each of which transmits a modulated or unmodulated carrier signal. A reference unit at known fixed position receives the said standard broadcast signals in the vicinity, samples the frequencies and content values of their signals and broadcasts the said measured frequency and content data nearly simultaneously with a time mark representing the time of said measurement and further broadcasts its position in latitude and longitude. A mobile unit at an unknown position to be determined receives the said standard broadcast signals in the vicinity and measures the time of arrival of their broadcast, recording the time of said measurement.

20 Claims, 14 Drawing Sheets

(56) References Cited

U.S. PATENT DOCUMENTS

| | | |
|---|---|---|
| 8,085,201 B2 | 12/2011 | Ladd et al. |
| 8,558,738 B2 | 10/2013 | Ladd et al. |
| 9,285,453 B2 | 3/2016 | Schantz et al. |
| 9,301,156 B2 | 3/2016 | DiFazio et al. |
| 9,451,400 B2 | 9/2016 | DiFazio et al. |
| 9,476,962 B2 | 10/2016 | Murphy et al. |
| 9,588,218 B2 | 3/2017 | Kennedy et al. |
| 9,681,408 B2 | 6/2017 | Marshall |
| 2002/0126046 A1* | 9/2002 | Counselman, III ....... G01S 5/10 342/464 |
| 2005/0001742 A1* | 1/2005 | Small ...................... G01S 19/23 342/357.62 |
| 2011/0304499 A1* | 12/2011 | Eidloth .................. G01S 11/02 342/464 |
| 2016/0014713 A1 | 1/2016 | Kennedy et al. |
| 2016/0306048 A1 | 10/2016 | Dunn et al. |
| 2020/0142079 A1 | 5/2020 | Sun et al. |
| 2022/0128679 A1 | 4/2022 | Flynn |

\* cited by examiner

SYSTEM FOR ACCURATE GEOSPATIAL LOCATION AND TIME TRANSFER USING RADIO TRANSMISSIONS WITHOUT SATELLITE SIGNALS

CROSS-REFERENCE TO RELATED APPLICATIONS

This application is a continuation-in-part of U.S. Non-Provisional patent application Ser. No. 17/511,126, filed 26 Oct. 2021, which claims the benefit of U.S. Provisional Application Ser. No. 63/105,844 filed on Oct. 26, 2020. The contents of which are incorporated herein by reference in their entirety as if fully set forth below.

FIELD OF THE DISCLOSURE

The disclosed technology relates to geospatial systems, and more particularly to systems and methods for accurate geospatial location using radio transmissions without satellite signals.

BACKGROUND

Geolocation using a Global Positioning System (GPS) relies on precisely measuring the transit time of signals received from several satellites to identify the location of the receiver. Precise timing is fundamental to an accurate GPS location. The time from an atomic clock onboard each satellite is encoded into the radio signal and the receiver determines how much later it received the signal than it was sent. Since its introduction in the 1980's, the Global Positioning System (GPS), has become increasingly utilized to provide accurate position and to disseminate standard time to users around the world.

In recent years, several vulnerabilities of GPS have been uncovered. Not only could it be jammed and/or "spoofed," but the GPS satellites were also vulnerable to recently developed technologies that can be used to destroy or disable satellites on orbit. Jamming is the process where an adversary prevents the reception of the GPS signals by the user's receiver, denying the user the position and time information. Spoofing is a more sophisticated process whereby the adversary mimics the GPS signals and convinces the user's receiver that it is not where it actually is but anywhere the adversary wishes it to be. Timing can be affected the same way. There are also ever-present dangers of solar radiation from eruptions on the sun.

Despite these weaknesses, GPS is still used for the simple reason that there is nothing to replace it. GPS timing is vital to the control of the national power grid, the smooth flow in information on the Internet, and the legal time stamping of financial transactions. Other uses include transportation and research.

It is estimated that, with the collapse or compromise of GPS, the Internet could grind to a halt within minutes to hours and we would lose the national power grid within a day. These failures would continue as long as the GPS outage persisted.

The United States Government has recently mandated through presidential executive order that steps be taken to eliminate dependence on GPS, or any satellite based timing or positioning system, and develop an entirely terrestrial system for positioning and time transfer. Previous attempts have required a large bandwidth back channel, making the system too bulky to be effective. Other attempts to remove reliance on GPS have been proposed, such as described in U.S. Pat. No. 8,085,201, which requires one or more transmitters with known locations, and a base receiver with a clock and a known position to determine ranges to the transmitters. Such systems take a series of samples of the signals of opportunity and time tags the series with times of receipt to calculate times of transmission based on the calculated ranges, or both, which also requires known locations of at least two positions to properly function.

Conventional satellite-based systems such as GPS positioning, navigation and timing systems and terrestrial-based systems such as the now decommissioned LORAN system use special-purpose transmitters. These systems depend upon synchronized transmitters whose relative signal phases or times of arrival at a position (to be determined) can be calculated within the service area independently of the receiving equipment. Synchronization is usually achieved through methods based on frequency, phase, and position of the transmitters. Maintaining such synchronization requires infrastructure that is costly in terms of both initial equipment acquisition and routine operation. Traditionally, signal correlation often required resolution of "cycle ambiguity." This term refers to the ambiguous appearances of the cycles comprising a sinusoidal carrier wave. Ambiguity may interfere with identifying time or phase in a carrier wave beyond one wavelength.

There is a need for systems and methods to provide accurate geospatial location using radio transmissions without satellite signals, and without some of the drawbacks and vulnerabilities of the above-referenced conventional systems.

BRIEF SUMMARY

The disclosed technology may be utilized to overcome some or all of the above-referenced limitations and drawbacks of conventional GPS technology. The disclosed technology includes systems and methods for accurate geospatial location using radio transmissions without satellite signals. In accordance with certain exemplary implementations of the disclosed technology, signals used for positioning and timing may be uncorrelated, freely-available carrier signals of opportunity at frequencies across the radio spectrum. The disclosed solution does not utilize sinusoidal carrier wave measurement and does not suffer from cycle ambiguity.

These and other aspects of the present disclosure are described in the Detailed Description below and the accompanying drawings. Other aspects and features of examples will become apparent to those of ordinary skill in the art upon reviewing the following description of specific, examples in concert with the drawings. While features of the present disclosure may be discussed relative to certain examples and figures, all examples of the present disclosure can include one or more of the features discussed herein. Further, while one or more examples may be discussed as having certain advantageous features, one or more of such features may also be used with the various examples discussed herein. Similarly, while examples may be discussed below as device, system, or method examples, it is to be understood that such examples can be implemented in various devices, systems, and methods of the present disclosure.

BRIEF DESCRIPTION OF THE DRAWINGS

The following detailed description of specific examples of the disclosure will be better understood when read in conjunction with the appended drawings. To illustrate the disclosure, specific examples are shown in the drawings. It should be understood, however, that the disclosure is not limited to the precise arrangements and instrumentalities of the examples shown in the drawings.

DETAILED DESCRIPTION

Figure 1:
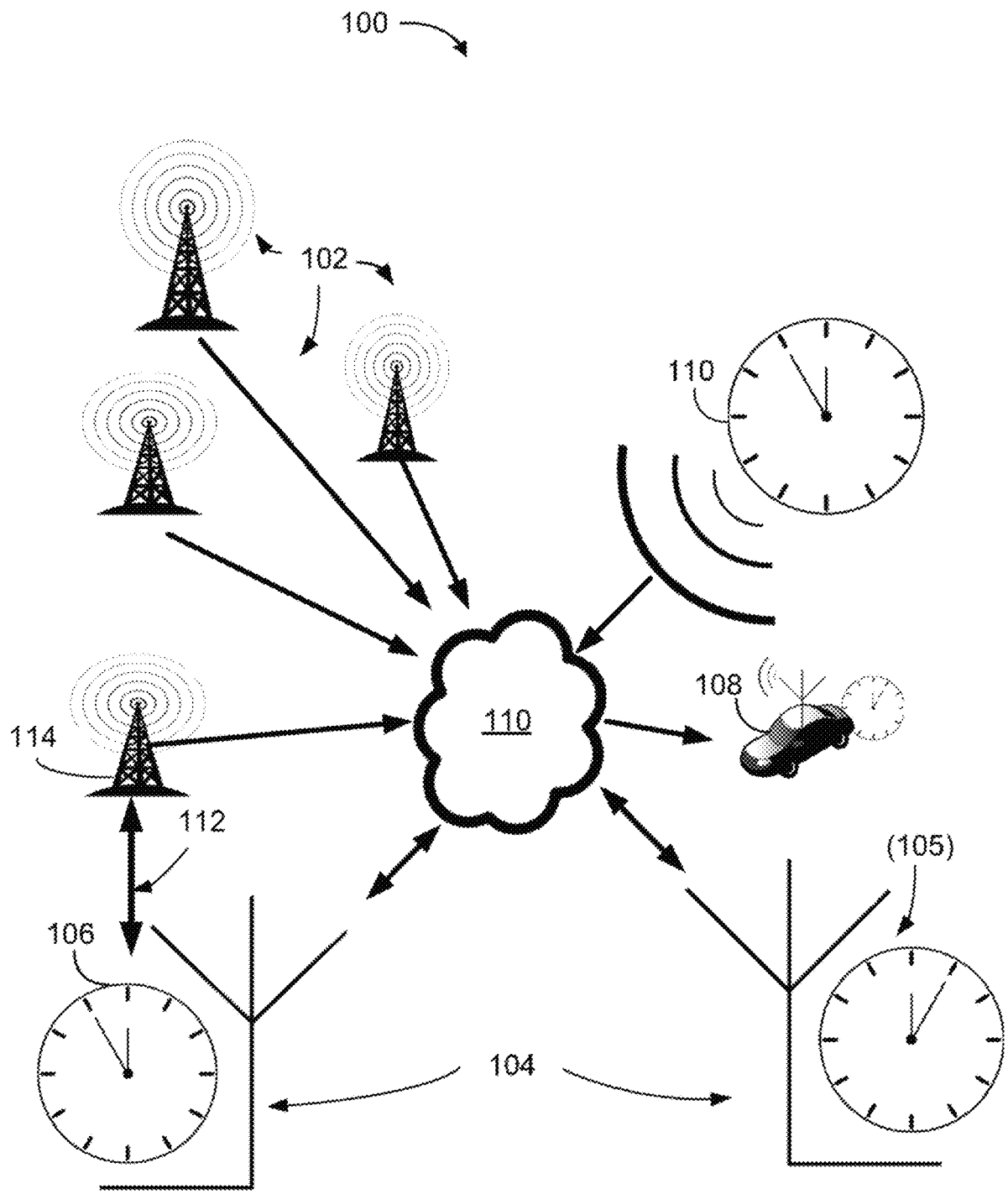
FIG. 1 is a diagram of a system for accurate geospatial location using radio transmissions without satellite signals, according to one example of the disclosed technology.

The disclosed technology includes positioning, navigation, and timing systems in which a mobile/remote device or at an unknown position receives broadcast signals from several known positions and uses such information to derive a current position of a remote receiver. Certain exemplary implementations of the disclosed technology may utilize uncoordinated "signals of opportunity" from a variety of transmitters operating at different frequencies to enable position and timing determination. The disclosed technology overcomes the limitations of the prior art by providing a system for accurate geospatial location using radio transmissions without satellite signals. The disclosed technology is a new way of using existing signals to determine position of a user device, and to transfer time accurately and precisely from a master clock to the user device clock. Certain exemplary implementations of the disclosed technology utilize unique signal comparison techniques to extend precision.

In accordance with certain exemplary implementations of the disclosed technology, the position and timing measurement systems disclosed herein may use standard uncorrelated radio broadcast signals, each of which may transmit on an assigned frequency from a known position defined in latitude and longitude, and each of which transmits a modulated or unmodulated carrier signal. A reference unit at known fixed position may receive the standard broadcast signals in the vicinity and may sample the frequencies and content values of their signals. The reference unit may then broadcast the measured frequency and content data nearly simultaneously along with a time mark representing the time of measurement. The reference unit may further broadcast its position in latitude and longitude.

A mobile/remote unit at an unknown position (to be determined) may receive the standard broadcast signals (in the vicinity of the mobile/remote unit) and may measure the time of arrival of their broadcast, recording the time of the measurement. The mobile/remote unit may also receive the reference unit broadcasts. In certain exemplary implementations, the mobile/remote unit may compute its current position relative to the position of the reference unit using an internal database of broadcast transmitter positions, the data broadcast by the reference unit, and digital content values measured by the mobile/remote unit adjusted in time to coincide with the times of measurement by the reference unit. The relative position measurements may be performed entirely within the mobile/remote unit without use of external processing means and are herein referred to as the "first-fix." Once a first-fix position has been determined, mobile units initiate "tracking mode" wherein they make measurements of the digital signal time delay periodically and calculate their current position and velocity by comparing current signal samples to the signal samples measured in prior measurements. During tracking mode, first-fix computations run in the mobile unit as a background process. The results of tracking and first-fix computations are compared. When accumulated tracking mode errors exceed a specified deviation from the first-fix mode value, the tracking mode result is updated to the current first-fix value. The reference device containing a rubidium clock maintains accurate time for long periods and is synchronized to standard NIST clocks periodically. Remote devices containing low-cost oven-controlled clocks are disciplined continually by the reference device to maintain highly accurate time synchronization. Additionally, the reference and remote devices parse the digital samples into increments of sub 100 ns to provide highly accurate time transfer from the reference device to the remote device.

In accordance with certain exemplary implementations of the disclosed technology, reference signal data may be formatted in a unique way, such that it contains all the information about the transmitter and reference locations. In certain exemplary implementations, the reference data may be sent by AM transmitters themselves. Certain exemplary implementations of the disclosed technology may utilize hyperbolic navigation on sphere or oblate spheroid. The disclosed technology can be used to relay time information without the use of the Internet, satellite signals or the cell phone network.

The disclosed technology may provide a technical improvements and/or advantages in that it can provide a terrestrial alternative to GPS for time transfer and positioning, it can leverage existing infrastructure, and/or it requires only a modest investment in the master stations in each market.

It is a general objective of the disclosed technology to provide improved techniques for positioning, navigating, and timing by utilizing radio broadcast signals. Disclosed are improved techniques for positioning and timing utilizing radio signals received from a multiplicity of transmitters having, respectively, broadcast data that are uncorrelated in frequency, phase and time. The disclosed technology provides improved techniques for determining position and timing by utilizing radio signals emitted by uncorrelated transmitters. Certain exemplary implementations of the disclosed technology may be utilized to provide position, navigation, and/or timing services indoors and in urban canyons where satellite-based systems operate poorly or not at all. Certain exemplary implementations of the disclosed technology may be utilized to provide global coverage potential so as to serve as a potential backup for satellite-based systems and to provide high-reliability service with minimum vulnerability to jamming, interference, and spoofing. Certain exemplary implementations of the disclosed technology may be used to provide highly-accurate time-transfer based on terrestrial signals to prevent disruption in the U.S. energy grid, communications networks, and financial systems.

The disclosed technology includes a method of determining an unknown position using radio signals from a plurality of transmitters having known positions and transmitting on a wide range of radio frequencies. The method can include comparing samples of the radio signals arriving concurrently at a known reference position and calculating their distances backward to their transmitting points to obtain a first set of comparison samples. The samples of radio signals arriving concurrently at an unknown position may be measured almost simultaneously with their arrival at the known position to obtain a second set of sample data. According to an exemplary implementation of the disclosed technology, the first and second data sets may be compared and analyzed to determine the unknown position.

In certain exemplary implementations, radio signals may arrive at the known and unknown positions from the plurality of transmitters which operate independently in an uncorrelated manner and whose radio signals are each transmitted with different carrier frequencies. In certain exemplary implementations, the "first set of data" refers to a first instance of concurrent-signal-arrival at the known position and the "second set of data" refers to a second instance of concurrent-signal-arrival time at the unknown position. The time difference between the first and second instances may be minimized by synchronizing the first and second measurements using a timing mark that is available at both positions at nearly the same time.

The disclosed technology may provide a robust level of security, using a wide choice of signals in any area, which can provide resistance to spoofing and jamming, two weaknesses discovered recently about GPS. In certain exemplary implementations, the disclosed system may require no prior knowledge of its location and may be started without any operator input. Certain exemplary implementations of the disclosed technology may support the timing requirements of the power grid and financial transactions completely independent of the INTERNET, satellite signals, and the cell phone network. In the event of a national emergency causing or caused by the disruption of GPS timing and positioning, examples disclosed herein may offer an entirely terrestrial back up or alternative. Certain exemplary implementations of the disclosed technology may work as well on moving platforms as it does in fixed position operation. Certain exemplary implementations of the disclosed technology may be utilized to fulfill the mandates and anticipated legislation that will require critical infrastructure, such as the power grid, to use GPS independent systems for time transfer.

The disclosed technology takes advantage of the relationship between time and position. To illustrate this relationship, consider a scenario where an observer witnesses a bolt of lightning striking a radio tower: the flash from the lightning can be seen almost instantly, but the noise of the thunder may not arrive until a few seconds later. Using the speed of sound, the distance from the observer to the radio tower can be calculated. For illustration purposes, consider the scenario where the tower is calculated to be 0.6 miles from the observer. A map of the region may be utilized, and a circle with a 0.6 mile radius (not to scale) may be drawn on the map around the tower, and the observer will be located somewhere on that circle. If the observer then can see lightning hit other towers, a similar process may be used to calculate the distance from the observer to the other towers, and corresponding circles with corresponding radii may be drawn around the other towers. The location of the observer may correspond to the point where all of the circles cross. This illustrates how the speed of sound and known positions of a plurality of radio towers may be used to determine the observer's position.

In another illustrative example, consider a scenario in which a first person is separated some distance from a second person. The first person has a very accurate watch, but the second person has an inaccurate watch that runs slow. Both the first person and the second person can see lightning that has hit a radio tower at essentially the same time (ignoring the delay for light to travel). The second person may call the first person to and ask them what time was on their watch when the lightning hit, and the response is 1:45 pm and 10 seconds. However, the second person recorded the lightning flash at 1:44 pm and 55 seconds. Given this information, the second person may deduce that their watch is running 15 seconds slow. This is a simple illustration of time transfer.

As disclosed herein, the term "time transfer" can refer to the process of determining the epoch error of a second clock based on the epoch time known at a reference clock. The second clock may then be corrected to have the same epoch time as the reference clock. The determination may account for the distance between the two clocks and the fact that signals between the clocks can travel no faster than the speed of light.

Certain exemplary implementations of the disclosed technology may utilize a version of time transfer to synchronize associated clocks. Certain exemplary implementations of the disclosed technology may utilize a version of the relationship between time and position to determine a position of a mobile/remote device.

Methods and devices that implement the examples of the various features of the disclosed technology will now be described with reference to the drawings. The drawings and the associated descriptions are provided to illustrate examples of the disclosed technology and not to limit the scope of the disclosed technology. Reference in the specification to "one example/implementation" or "an example/implementation" is intended to indicate that a particular feature, structure, or characteristic described in connection with the example is included in at least an example of the disclosed technology. The appearances of the phrase "in one example/implementation" or "an example/implementation" in various places in the specification are not necessarily all referring to the same example/implementation.

Various examples provide a system for accurate geospatial location and time transfer using radio transmissions without satellite signals. One example of the disclosed technology provides a system for accurate geospatial location and time transfer using radio transmissions without satellite signals. In another example, there is provided a method for using the system. The system and method will now be disclosed in detail.

FIG. 1 is a diagram of a system 100 for accurate geospatial location and time transfer using radio transmissions without satellite signals, according to one example of the disclosed technology. The system 100 includes three or more AM transmitters 102 that can include the high definition (HD) channel. The system 100 includes one or more reference station 104, each with a stable clock 106. The system includes one or more mobile/remote receivers 108, each with a stable clock. The system may be in communication with the national time standard (such as the National Institute of Standards and Technology) for receiving accurate time.

In accordance with certain exemplary implementations of the disclosed technology, each geographical area of an approximately 150 mile radius may have a reference station 104 that may receive the AM spectrum from the three or more AM transmitters 102 and may sample and save a "snapshot", e.g., a brief recording of the associated signal waveforms. The snapshot may be formatted into a data block and may be time stamped based on the reference station 104 clock 106. The reference receiver may send this data block via a dedicated link 112, e.g., microwave or optical, to a synchronizing transmitter 114. In certain exemplary implementations, the synchronizing transmitter 114 may broadcast the data block over its HD channel.

In accordance with certain exemplary implementations of the disclosed technology, an unlimited number of mobile/remote receivers 108 may be configured to receive the time stamped data block over the HD channel. Each mobile/remote receivers 108 may also take a corresponding snapshot of the AM spectrum near the same time that the reference station 104 took the spectrum snapshot. Each mobile/remote receiver 108 may use the reference data block to compare the relative times of arrival between signals from each of the same three or more transmitters 102. The reference data block may also include the exact position of all the AM transmitters 102 and the location of the reference station 104. The mobile/remote receivers 108 may use this position information, together with the differences in time of arrival determined by the signal comparison to determine the remote station 104 location and the timing error of the remote station clock 106. The remote station 104 may correct or discipline its clock 106 and present the time and position to the mobile/remote receivers 108.

In accordance with certain exemplary implementations of the disclosed technology, the reference stations 104 may also transfer time between each other in the same way as the time is transferred from reference stations 104 to the mobile/remote receivers 108, which may result in a network covering a large area (such as the entire continental United States), for example, to disseminate time from the national standard clock 110.

According to certain exemplary implementations, the system 100 may use signals sent out by the transmitters 102 24 hours a day. These signals may stream out in all directions from the transmitters 102 towers at the speed of light, which is very accurately known. However, the exact time when those signals are sent is unknown. In other words, we have no idea when the announcer on a particular station is going to say a particular word during the traffic report. As in the illustrative example above involving lightning, we may not know when lightning would hit the radio tower, but the flash of light provides information as to when the lightning hit the tower.

According to an exemplary implementation of the disclosed technology, the reference station(s) 104 may be placed at very accurately known position(s). The reference station(s) 104 may also have very accurate clock(s) 106. In an exemplary implementation, once per second, on the second, the reference station 104 may take an electronic snapshot of all or part of the AM radio spectrum, recording what each transmitter 102 is transmitting. The reference station 104 may format this information into a block of data. The reference data has a time stamp with the date and precise time the snapshot was taken. This data block may then be sent to one of the AM transmitters in the area which has a contract with the company that owns the reference station 104. The data block can be sent out on a special channel, commonly called the HD channel, which utilizes bandwidth between channels.

In a common scenario, a user may want to determine their current location, and they may use a remote receiver 108 to do so. The remote receiver 108 may also include a clock which may not be as precise as the other clocks 106 110 and which may be set to the accurate time. As discussed above, the remote receiver 108 may also take snapshots of the AM spectrum once a second on the second. However, since the remote receiver 108 clock may be inaccurate, the snapshot may be slightly earlier or later than the one taken by the reference station 104. The remote receiver 108 may also be listening on the HD channel that has the reference data block. Based on the information in the data block, the remote receiver 108 may determine roughly what time it is. "Roughly" because it takes a certain amount of time for the signal to get to the synchronizing transmitter 114 from the reference station 104 and then from the radio transmitter 102 to the remote receiver 108. To figure out the time—and find out where the remote receiver 108 is located, the remote receiver 108 may compare two snapshots: the one it took and the one sent out by the reference station 104. Based on the comparison of the two snapshots the remote receiver 108 may determine its position relative to transmitters 102 and the reference station 104, as will be further described below.

As will be discussed in detail below, certain implementations of the disclosed technology may utilize overlapping circles to determine the location of the remote receiver 108. By virtue of knowing where the reference station 104 is and the positions of the transmitters 102, the remote receiver 108 may utilize circles (or a hyperbolas) based on associated delays. Such curved lines represent points where the time difference between the arrival information from transmitters 102 is the same, and the remote receiver 108 is somewhere on that line. In accordance with certain exemplary implementations of the disclosed technology, the remote receiver 108 may compute the curved lines from different pairs of transmitters 102 and where they cross is the (still possibly ambiguous) position of the remote receiver 108. The remote receiver 108 may determine the times the individual signals arrived and may determine the amount of time the remote receiver's 108 clock is off from the reference station 104 clock 106.

The remote receiver 108 may now know where it is and how far its clock is off. In accordance with certain exemplary implementations of the disclosed technology, the remote receiver 108 may set its own clock precisely—to less than one tenth of one microsecond—and present this time and its position to the user.

In accordance with certain exemplary implementations of the disclosed technology, the above-referenced calculations may be done in less than a fraction of a second and the whole process may repeat one second later. If the remote receiver 108 is moving, the remote receiver 108 may know its location and direction of movement. If the remote receiver 108 is in a car that drives far enough, it may move out of the area covered by the reference station 104, which may be about 150 miles in a circle. In this scenario, the remote receiver may automatically change over to a next reference station in the new area and keep navigating and telling time.

The system 100 has one other advantage. It can transfer time from reference station 104 to reference station (105), just as it does from the reference station 104 to the remote receiver 108. In this way time can be transferred all over the nation from the U.S. atomic clock standard 110 in Boulder, Colorado. Even if the Internet and cell phone networks go down, the system may keep functioning and help bring both of them back on-line in a national emergency.

Figure 2:
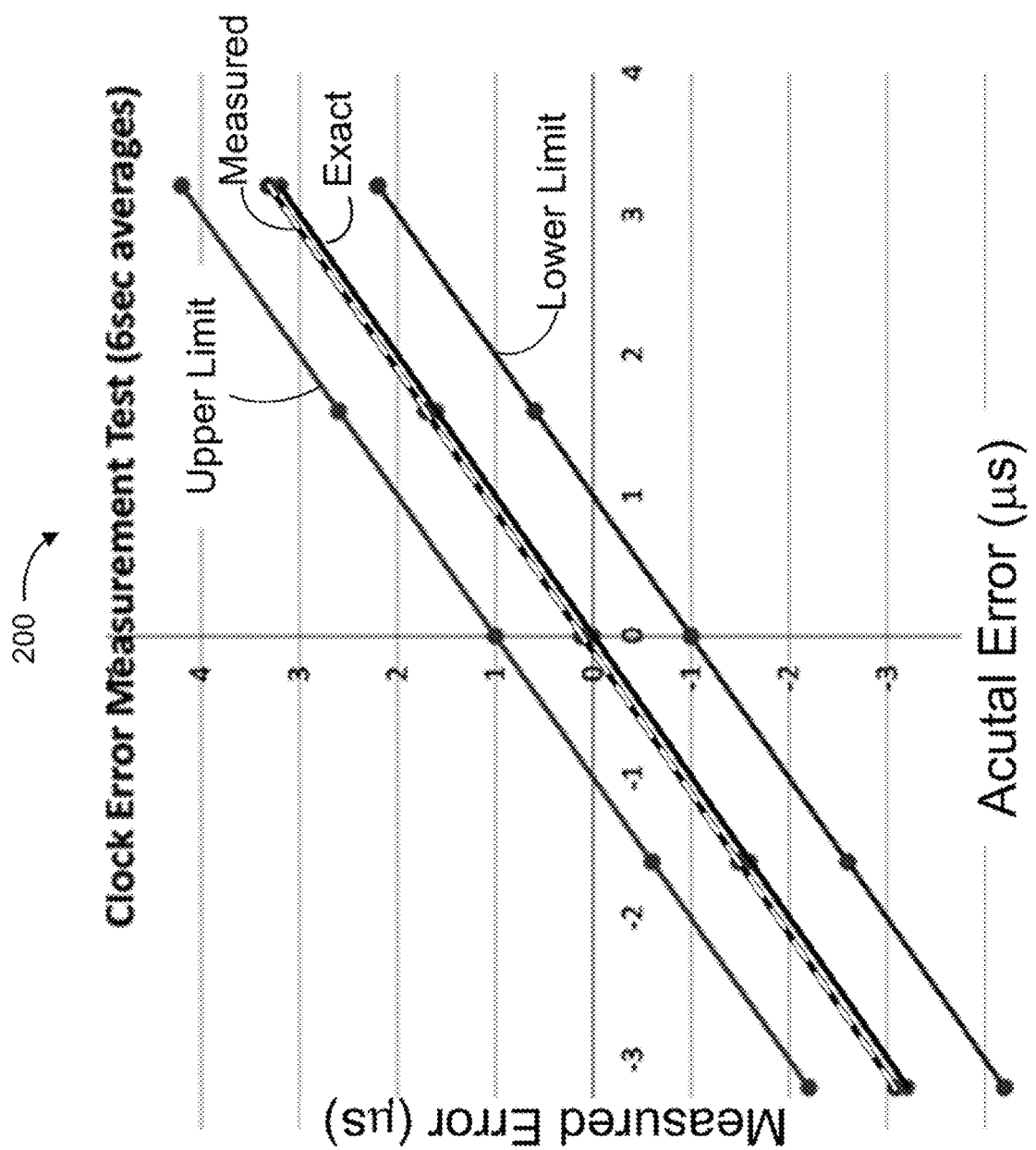
FIG. 2 is a chart comparing of the measured timing error and the actual induced timing error using actual off-air signals.

FIG. 2 is a chart comparing of the measured timing error and the actual induced timing error. This chart shows a comparison of the measured timing error and the actual induced timing error for the tests carried out in January 2020 with actual off-air signals. The horizontal axis is the induced error between the reference station and the remote station. The vertical axis is the measured error. The upper and lower limits are the upper and lower bounds of the NIST timing requirements of +/−1 µs.

Figure 3:
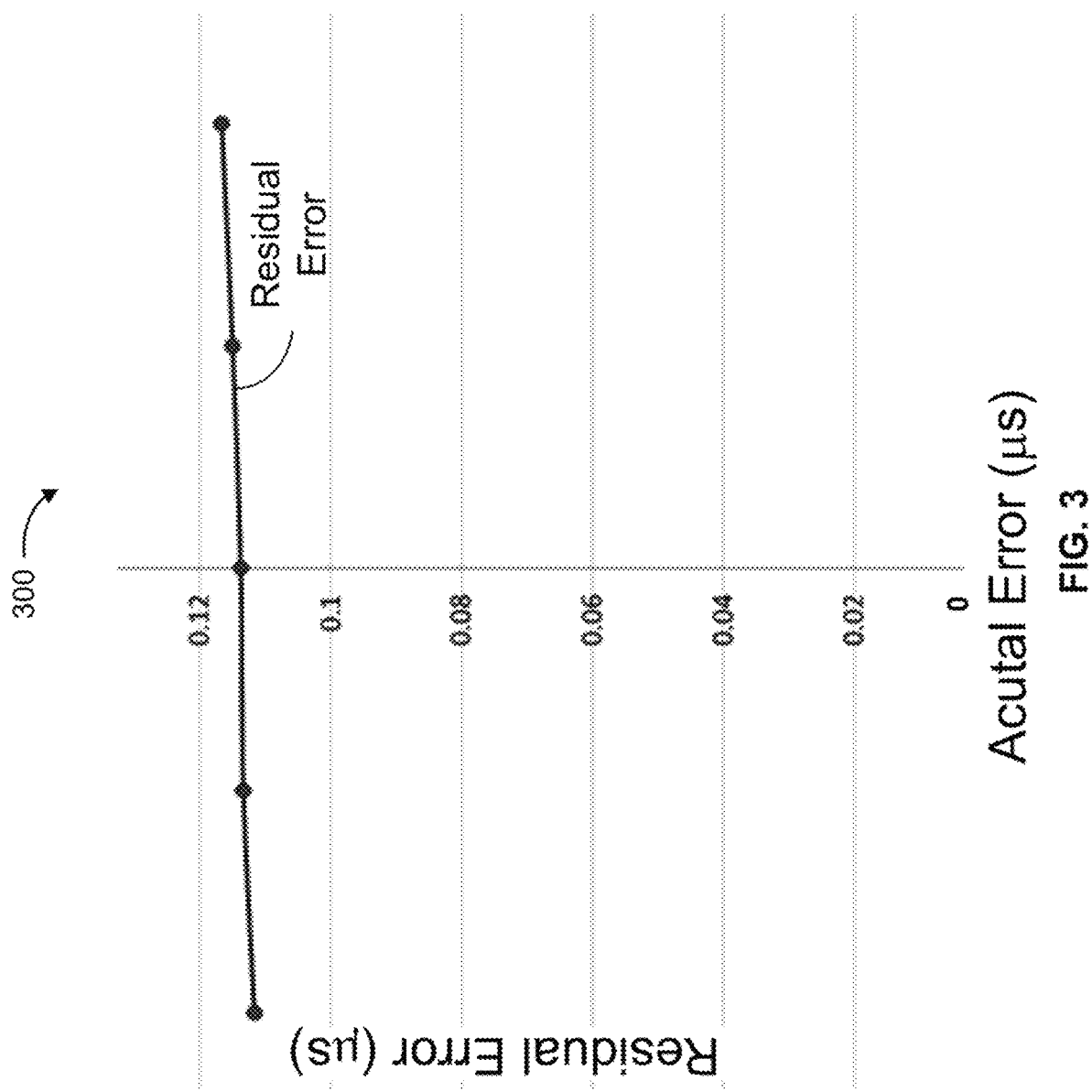
FIG. 3 is a chart showing the difference between the actual induced timing error and the measured timing error.

FIG. 3 is a chart showing the difference between the actual induced timing error and the measured timing error in the co-located time transfer tests conducted in January 2020 using actual off-air signals. The bias offset in the residual error is estimated to be due to an additional time offset between the sampling clocks of the reference and remote SDR receivers. This offset may be corrected based on this measurement in the actual implementation of the system or eliminated with improved synchronization between the master clocks and the sampling clocks at both the reference and the remote receivers.

Figure 4:
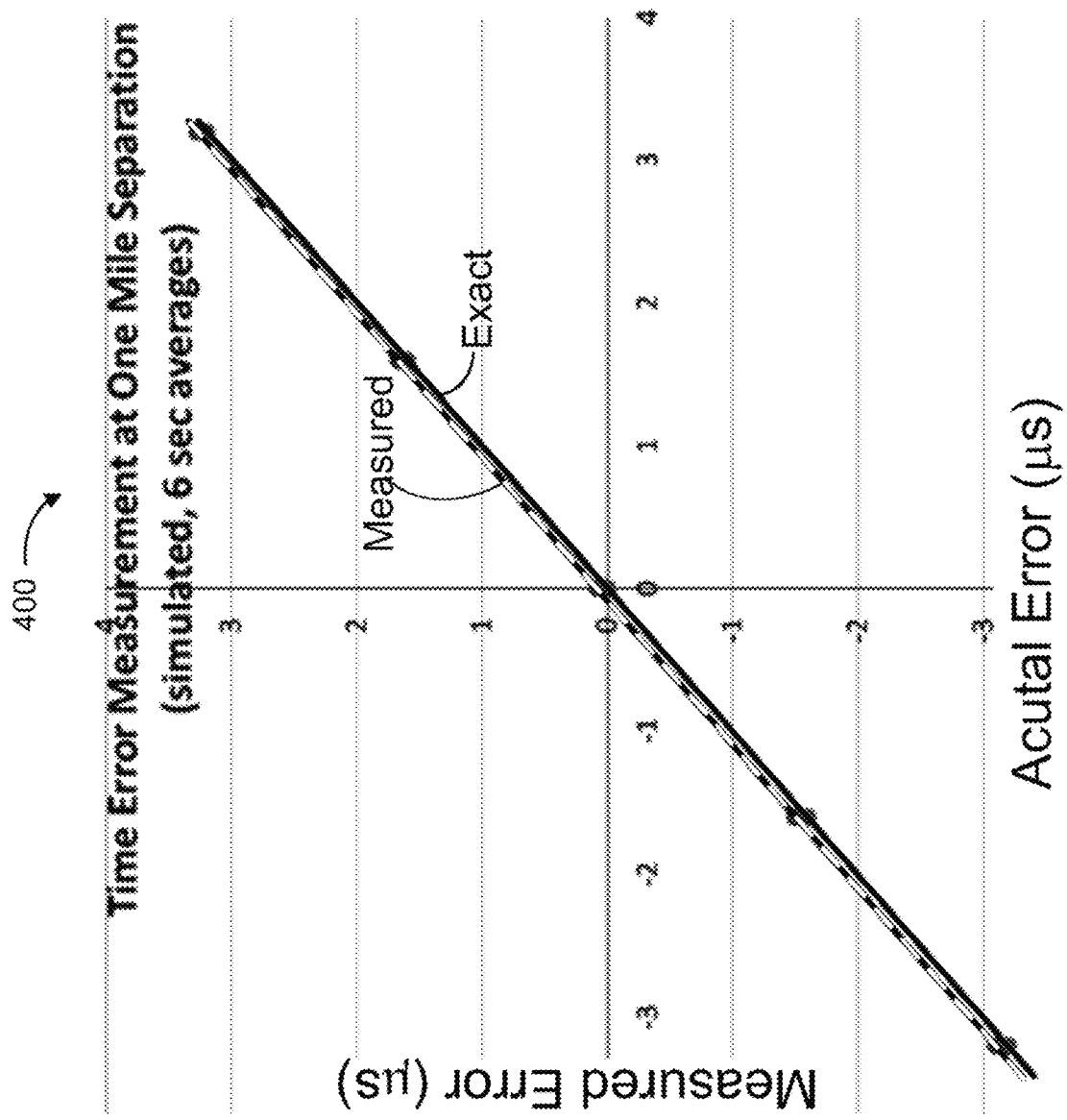
FIG. 4 is a chart comparing measured timing error and the actual induced timing error.

FIG. 4 is a chart comparing measured timing error and the actual induced timing error. This chart shows the comparison of the measured timing error and the actual induced timing error for the tests carried out in January 2020 with a simulated separation between the remote and reference units of one mile to the northwest using actual off-air signals.

Figure 5:
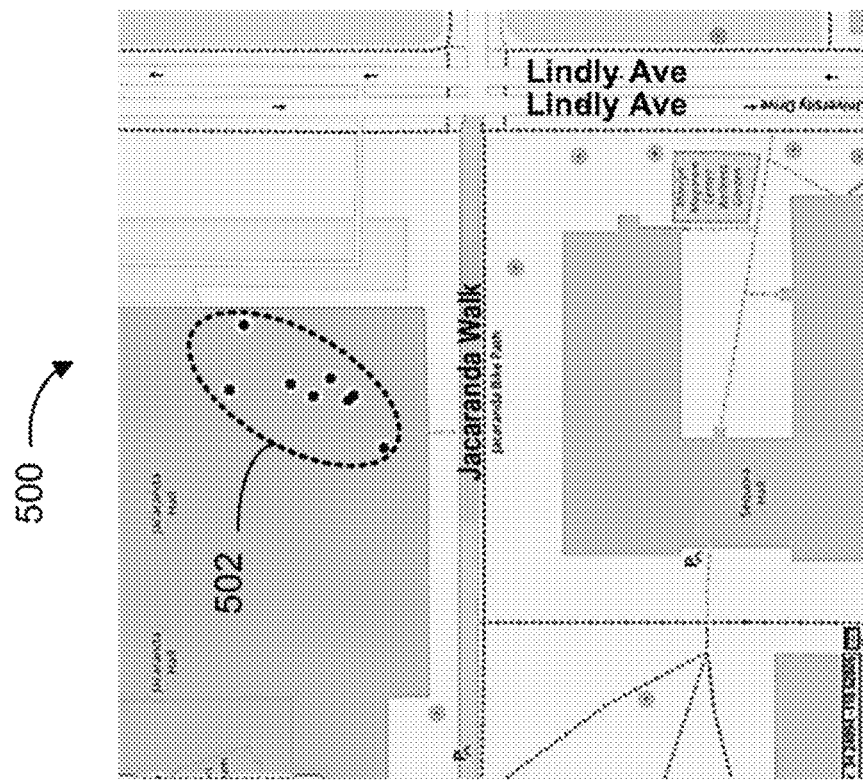
FIG. 5 is a chart of a position plot.

FIG. 5 is a chart of a position plot using the disclosed technology. The scatter plot of data points 502 correspond to a rooftop of the building where test antennas were installed at 34.21174, −118.528045. The data points 502 are raw position solutions without any averaging or noise reduction. The positions have an error of 17.6 m, 95% CEP with an offset of 9.9 m NNE. These errors can be significantly reduced with simple averaging of the positions and/or noise reduction techniques applied to the received signals.

Figure 6:
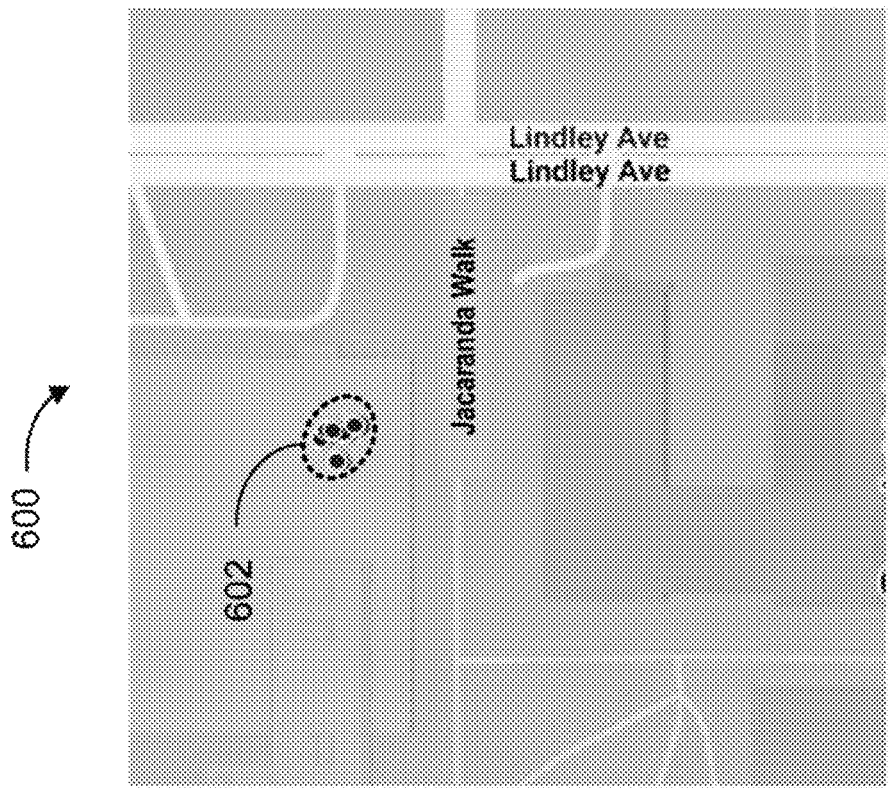
FIG. 6 is a map of position results using improved censoring techniques to eliminate poor signal quality.

FIG. 6 is a map of positions 602 similar to those shown in FIG. 5, but these results show a tighter scatter plot due to using improved censoring techniques to eliminate poor signal quality.

Figure 7:
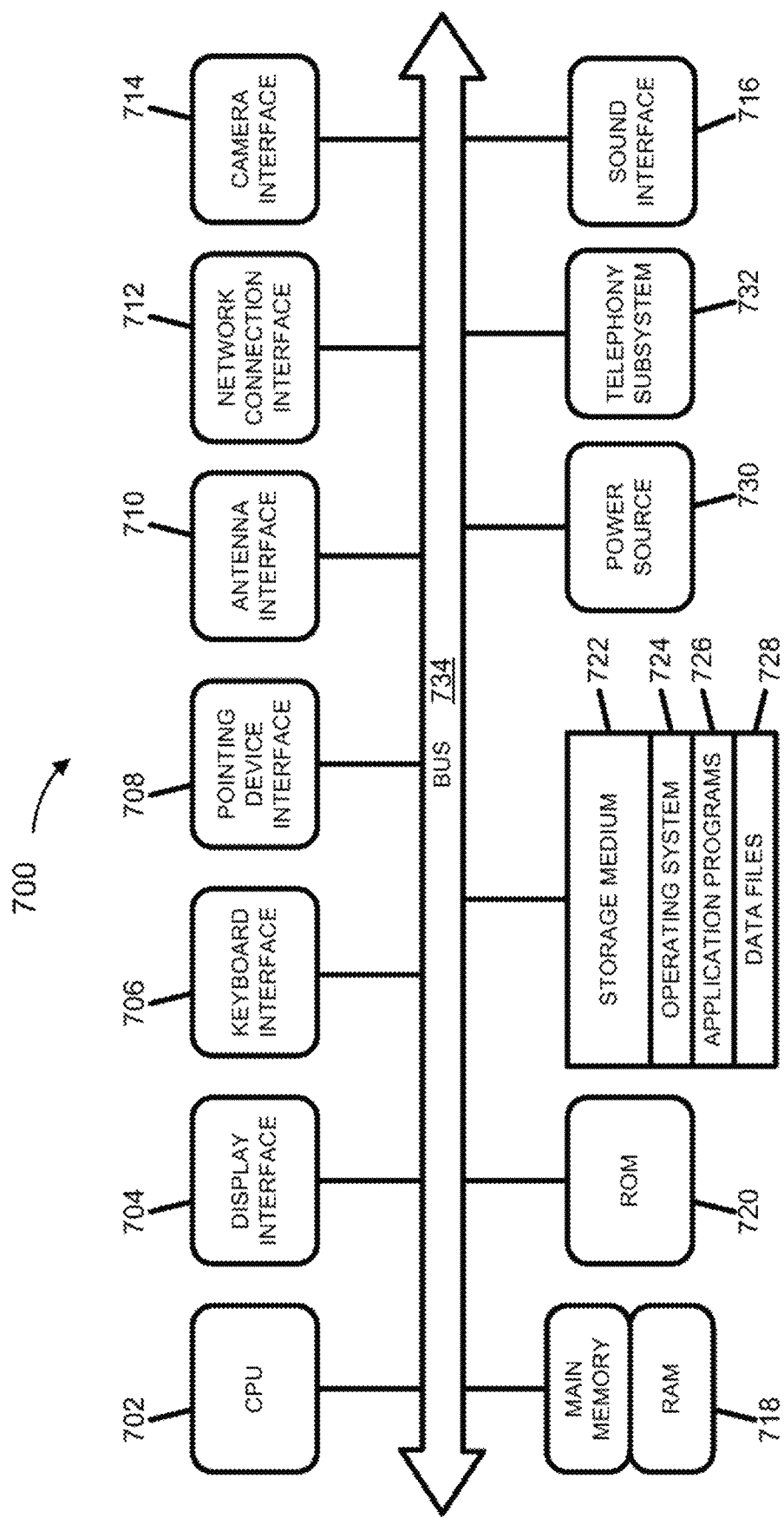
FIG. 7 is a block diagram of an illustrative computing device, In accordance with certain exemplary implementations of the disclosed technology.

FIG. 7 depicts a block diagram of an illustrative computing device 700 according to an example implementation. Certain aspects of FIG. 7 may be embodied in a receiver. According to one example implementation, the term "computing device," as used herein, may be a CPU, or conceptualized as a CPU (for example, the CPU 702 of FIG. 7). In this example implementation, the computing device (CPU) may be coupled, connected, and/or in communication with one or more peripheral devices, such as display. In certain implementation, the computing device 700 may be included in a mobile/remote unit and/or a reference receiver/transmitter. In another example implementation, the term computing device, as used herein, may refer to a processor and associated components in or associated with the disclosed systems.

In an example implementation, the computing device may output content to its local display and may transmit and receive messages via the antenna interface 710, the network connection interface 712, telephony subsystem 732, etc. In example implementation, the computing device may output content to an external display device (e.g., over Wi-Fi) such as a TV or an external computing system. It will be understood that the computing device 700 is provided for example purposes only and does not limit the scope of the various implementations of the communication systems and methods.

The computing device 700 of FIG. 7 includes a central processing unit (CPU) 702, where computer instructions are processed. Certain example implementations can include a display interface 704 that acts as a communication interface and provides functions for rendering video, graphics, images, and texts on the display. In certain example implementations of the disclosed technology, the display interface 704 may be directly connected to a local display, such as a touch-screen display associated with a mobile computing device. In another example implementation, the display interface 704 may be configured to provide content (for example, data, images, and other information as previously discussed) for an external/remote display that is not necessarily physically connected to the computing device 700. For example, a desktop monitor may be utilized for mirroring graphics and other information that is presented on a mobile computing device. In certain example implementations, the display interface 704 may wirelessly communicate, for example, via a Wi-Fi channel or other available network connection interface 712 to an external/remote display.

In an example implementation, the network connection interface 712 may be configured as a communication interface and may provide functions for rendering video, graphics, images, text, other information, or any combination thereof on the display. In one example, the computing device 700 may include a communication interface that may include one or more of: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 700 may include a keyboard interface 706 that provides a communication interface to a keyboard. In one example implementation, the computing device 700 may include a pointing device interface 708 for connecting to a presence-sensitive input interface. According to certain example implementations of the disclosed technology, the pointing device interface 708 may provide a communication interface to various devices such as a touch screen, a depth camera, etc.

The computing device 700 may be configured to use an input device via one or more of input/output interfaces (for example, the keyboard interface 706, the display interface 704, the pointing device interface 708, the antenna interface 710, the network connection interface 712, camera interface 714, sound interface 716, etc.,) to allow a user to capture information into the computing device 700. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 700 or may be a separate device. For example, the input device may be an accelerometer, a magnetometer, a digital camera, a microphone, and an optical sensor.

Certain example implementations of the computing device 700 may include an antenna interface 710 in communication with an antenna. Certain example implementations of the antenna interface 710 can include one or more of: a receiver, analog-to-digital converter, sampler, buffers, memory, and memory. Certain example implementations can include a network connection interface 712 that provides a communication interface to a network. In certain implementations, a camera interface 714 may act as a communication interface to provide functions for capturing digital images from a camera. In certain implementations, a sound interface 716 is provided as a communication interface for converting sound into electrical signals using a microphone and for converting electrical signals into sound using a speaker. According to example implementations, a random-access memory (RAM) 718 is provided, where computer instructions and data may be stored in a volatile memory device for processing by the CPU 702.

According to an example implementation, the computing device 700 includes a read-only memory (ROM) 720 where invariant low-level system code or data for basic system functions such as basic input and output (I/O), startup, or reception of keystrokes from a keyboard are stored in a non-volatile memory device. According to an example implementation, the computing device 700 includes a storage medium 722 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 724, application programs 726 and content files 728 are stored. In accordance with certain example implementations of the disclosed technology, the application programs 726 can include one or more of programs to: correlate, accumulate, discriminate, unfold multiply, divide, add, lowpass, etc.

According to an example implementation, the computing device 700 includes a power source 730 that provides an appropriate alternating current (AC) or direct current (DC) to power components. According to an example implementation, the computing device 700 can include a telephony subsystem 732 that allows the device 700 to transmit and receive sound over a telephone network. The constituent devices and the CPU 702 communicate with each other over a bus 734.

In accordance with an example implementation, the CPU 702 has appropriate structure to be a computer processor. In one arrangement, the computer CPU 702 may include more than one processing unit. The RAM 718 interfaces with the computer bus 734 to provide quick RAM storage to the CPU 702 during the execution of software programs such as the operating system application programs, and device drivers. More specifically, the CPU 702 loads computer-executable process steps from the storage medium 722 or other media into a field of the RAM 718 in order to execute software programs. Content may be stored in the RAM 718, where the content may be accessed by the computer CPU 702 during execution. In one example configuration, the device 700 includes at least 128 MB of RAM, and 256 MB of flash memory.

The storage medium 722 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 700 to access computer-executable process steps, application programs and the like, stored on removable and non-removable memory media, to off-load data from the device 700 or to upload data onto the device 700. A computer program product, such as one utilizing a communication system may be tangibly embodied in storage medium 722, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 702 of FIG. 7). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example implementation, the computing device may output content to its local display or speaker(s). In another example implementation, the computing device may output content to an external computing system.

Figure 8:
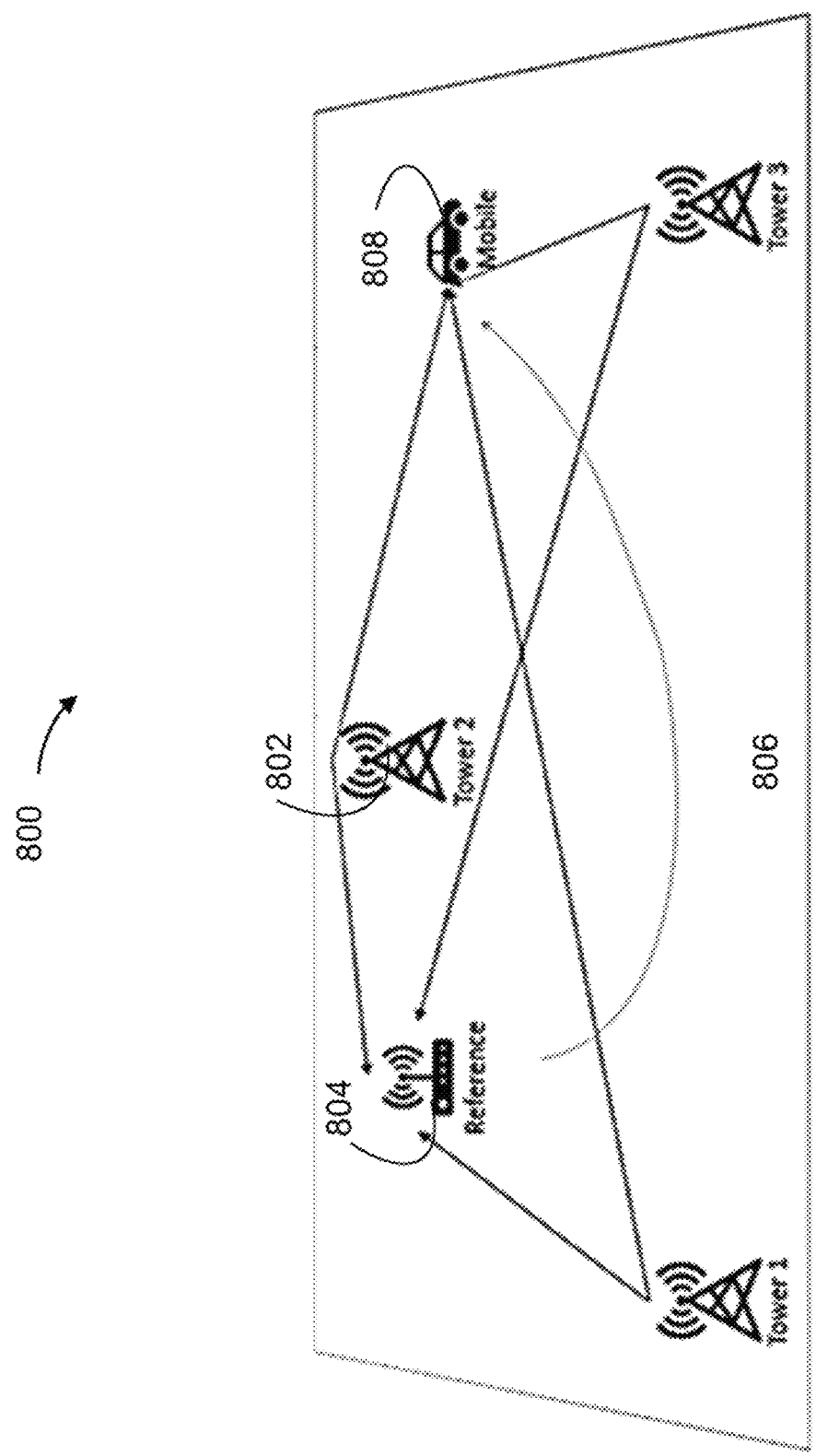
FIG. 8 depicts a small area on the earth's surface containing multiple standard radio or TV broadcast transmitter towers and a mobile receiver unit representing the disclosed technology.

FIG. 8 depicts a small area on the earth's surface containing multiple standard radio or TV broadcast transmitters 802 and a remote receiver 808, according to the disclosed technology. The transmitters 802 may correspond with the transmitters 102, as shown and discussed with reference to FIG. 1. Similarly, the mobile receiver 808 may correspond to the remote receiver 108 as shown and discussed with reference to FIG. 1.

The transmitters 802 are at various fixed and known positions in the region. In certain exemplary implementations, the transmitter towers 802 may broadcast amplitude modulated (AM) signals and may operate in the medium-wave broadcast band of frequencies between about 530 kHz and about 1700 kHz. Each transmitter 802 may have a unique fixed-frequency carrier assignment. The carrier may be present in the broadcast signal as a continuous-wave spectral component. On both sides of the carrier in the frequency domain are sidebands created by the amplitude modulation. In the United States, carrier frequencies are assigned by the Federal Communications Commission (FCC) and are constrained to be integer multiples of 10 kHz. The sidebands are limited to about +−5 kHz relative to the carrier frequency. In some other countries, carrier frequencies are assigned on 9 kHz spacings, and the bandwidth occupied by sidebands may be narrower. Generally, the transmitters within a region are assigned to non-overlapping frequencies to avoid interference. In some implementations of the disclosed technology, frequency modulated (FM) broadcast transmitters operating in the very-high frequency band of frequencies in the 30 MHz to 300 MHz may be utilized.

In accordance with certain exemplary implementations of the disclosed technology, the transmitters 802 may drive vertical antennas with respect to ground. The region of reception of their signals is typically several tens of kilometers from the transmitter 802. Within this region the signals propagate primarily in the "ground wave" mode, with vertical polarization. Ionospherically reflected "sky wave" signal components may be insignificant within this region. A ground-wave signal propagates radially outward horizontally from each antenna. Wavefronts of the carrier-wave component of each said signal are essentially circular, centered on the transmitting antenna. The wavelength (or the horizontal distance between wavefronts differing in phase by one cycle) of the transmitted signal is approximately equal to the speed of light in vacuum, approximately 3×10E8 m/s, divided by the respective carrier frequency in Hz. The precise wavelength depends on the electromagnetic properties (mainly the conductivity and permittivity) and thicknesses of subsurface layers. Formulas and procedures for calculating the ground wavelength are readily available in the technical literature of radio propagation.

For most practical purposes, over distances on the order of kilometers over relatively flat terrain, it is sufficient to use the wavelength in vacuum. More exact values of ground wavelength may be determined by traversing the region and simultaneously measuring ground-wave phases and position, with position being determined independently. Such accurate position information may be used, particularly in mountainous and hilly terrain, as the broadcast signal path may include vertical displacement that may need to be distinguished from horizontal displacement for position determination purposes.

The fixed reference station 804 may correspond to the reference station 104 as shown and discussed above with reference to FIG. 1. In certain exemplary implementations, the position of fixed reference station 804 is known. The position of mobile receiver 808 may be unknown and to be determined. Although mobile receiver 808 is depicted as a vehicle, it may be attached to an object or person whose position is to be determined. As previously discussed, the position of the mobile receiver 808 may be determined by calculation of data from modified time of arrival measurements of broadcast signals from fixed broadcast stations 802 and reference station 804 as disclosed herein.

In accordance with certain exemplary implementations of the disclosed technology, the reference station 804 may receive the broadcast signal components from the plurality of transmitters 802 and may sample and digitize the broadcast sample nearly simultaneously. A database of surveyed locations of the transmitter 802 the reference station 804 may be used to calculate the distances backward to the associated transmission points. This information may be sent to the mobile receiver 808. Concurrently, the mobile receiver 808 may measure its own set of data from at least three of the transmitters 802. The time difference between first and second sets of broadcast sample observations, for example, may be minimized by synchronizing the first and second sets with a timing mark that is generated and broadcast by the reference station 804.

In accordance with certain exemplary implementations of the disclosed technology, the above-reference data (distances from the reference station 804 to the transmitters 802) may be telemetered from reference station 804 to the mobile receiver 808. In certain exemplary implementations, the data may be sent through a data connection to one broadcast transmitter 804 where it may be multiplexed onto the broadcast signal and received by the mobile receiver 808. Methods of multiplexing the data onto the broadcast signal without causing perceptible interference to the primary modulation are well known to practitioners with industry experience. The data connection may be short when the reference station 804 is located near the transmitter 802. For long data connections, a data network infrastructure may be utilized. Alternative data telemetry techniques are also possible, including but not limited to the use of cellular radio and other wireless data transmission technologies.

In certain exemplary implementations, the reference station 804 may include a vertical antenna adapted for receiving the groundwave signals from transmitters 802. The mobile receiver 808 may also include a vertical antenna adapted for receiving the ground-wave signals from transmitters 802, which may also include any multiplexed data from the reference station 804 applied on the broadcast signal, as discussed above.

In certain exemplary implementations, the transmitters 802 may be located in a wide range of directions as viewed from the mobile receiver 808. However, it is not important that the transmitters be uniformly distant, uniformly spaced radially, or distributed in frequency in any particular manner. In general, the distribution of medium-wave broadcast stations throughout the United States is sufficient for the purposes of the disclosed technology. Very-high frequency waves may also be utilized as a backup or to augment the number of high quality signals, primarily for outdoor use.

A further advantage of using medium-wave broadcast signals as described herein is that they are transmitted at high powers of up to 50,000 Watts or more in many countries including the U.S.

In accordance with certain exemplary implementations of the disclosed technology, the carrier components, etc., of the transmissions from the transmitters 802 may be picked up by a receiver with very narrow bandwidth, and the received signal-to-noise density can be extremely high, thus benefiting reception range. Also, the low broadcast signal frequencies may be relatively immune to attenuation and reflection commonly experienced in urban areas.

Often an AM broadcast station has an antenna comprising two or more towers operating as elements of a directional array antenna. That is, each tower of the array is excited with the same frequency, but with different amplitudes and phases so as to form a beam of radiation or to avoid radiating in a particular direction. For the purposes of the disclosed technology, these multiple towers may be represented by a single antenna at the phase center of the array if receiving sites are in the far field.

Figure 9:
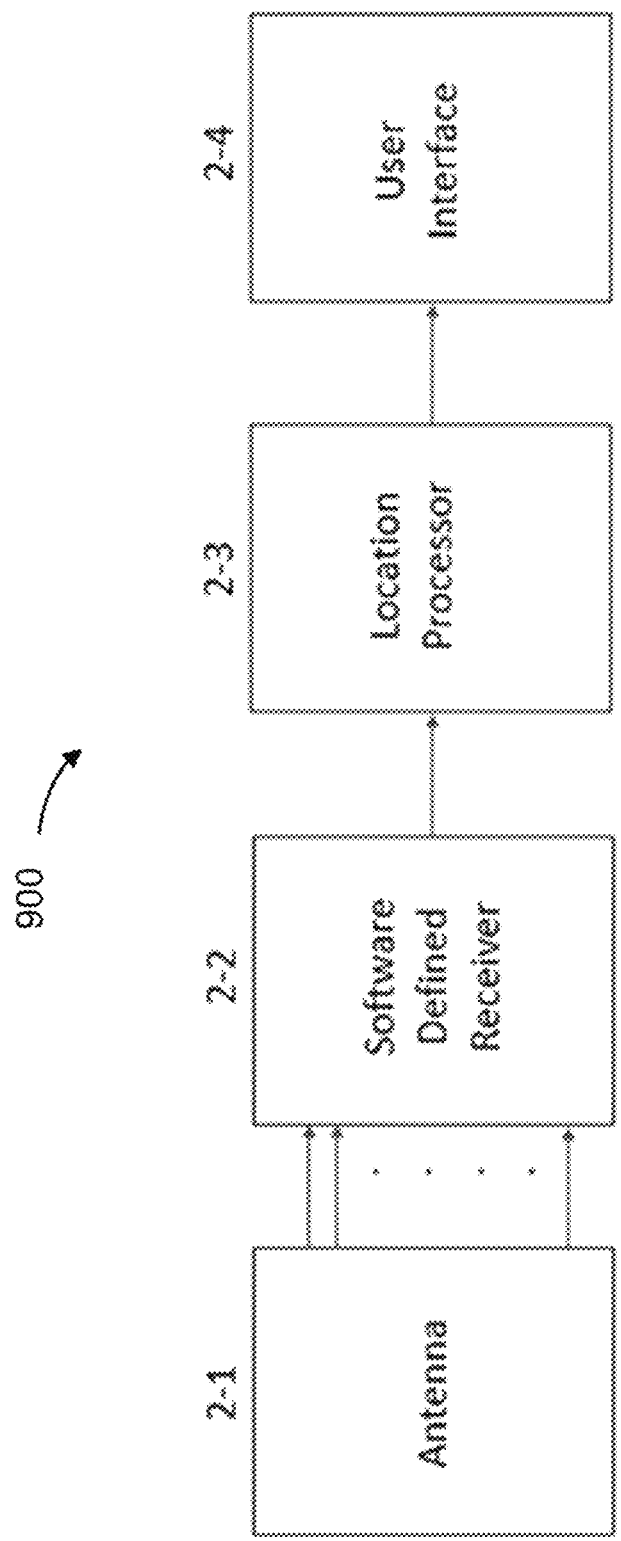
FIG. 9 is a block diagram of a mobile receiver unit, in accordance with an exemplary implementation of the disclosed technology.

FIG. 9 is a block diagram of a mobile receiver unit 900, in accordance with an exemplary implementation of the disclosed technology. In certain exemplary implementations, the components may be located both at a reference station (such as reference station 804 of FIG. 8) and at mobile receivers (such as the mobile receiver 808 of FIG. 8). In certain exemplary implementations, the components in the mobile receiver unit 900 these sites may be identical except for two items, as will be discussed below.

Analog broadcast signals between approximately 530 kHz and 1700 kHz can be received simultaneously on antenna 2-1. As depicted, the signals from the antenna can be transmitted to receiver 2-2. In some examples, receiver 2-2 can include an analog-to-digital-converter (ADC). In such an example, the receiver can (a) digitize the analog input spectrum from the antenna, (b) further processes the signal (such processing is described further throughout this disclosure), (c) and route the processed signal to a location processor 2-3. In some examples, the system may digitize the input signal with 16-bit resolution. As will be appreciated the chosen resolution will have speed vs accuracy considerations. Further, in some examples, the receiver may de-multiplex data originating from a reference unit and carried on a low-frequency or medium-frequency broadcast signal, or an alternate communication medium, for example, cellular.

As further depicted, the location processor 2-3 can receive the processed signal. The location processor 2-3 can subsequently perform position calculations based upon multiple input signal times of arrival and reference unit data (if applicable) and drives an optional user interface 2-4 that displays the determined position results. The user interface 2-4 can include keyboard or similar data input device whereby the user can enter commands to the mobile unit.

Figure 10:
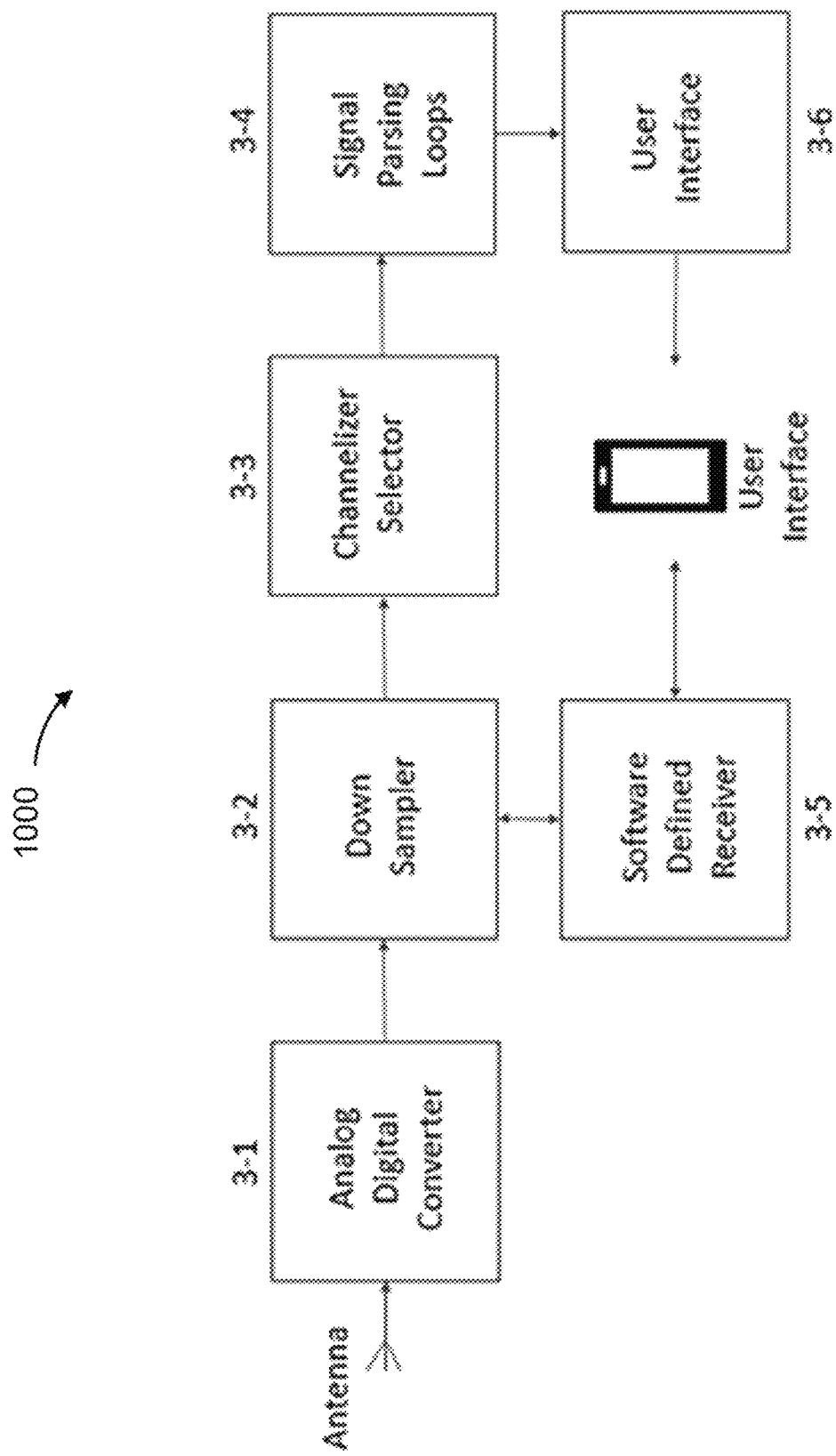
FIG. 10 is a detailed block diagram of a mobile receiver unit, in accordance with an exemplary implementation of the disclosed technology.
Figure 11:
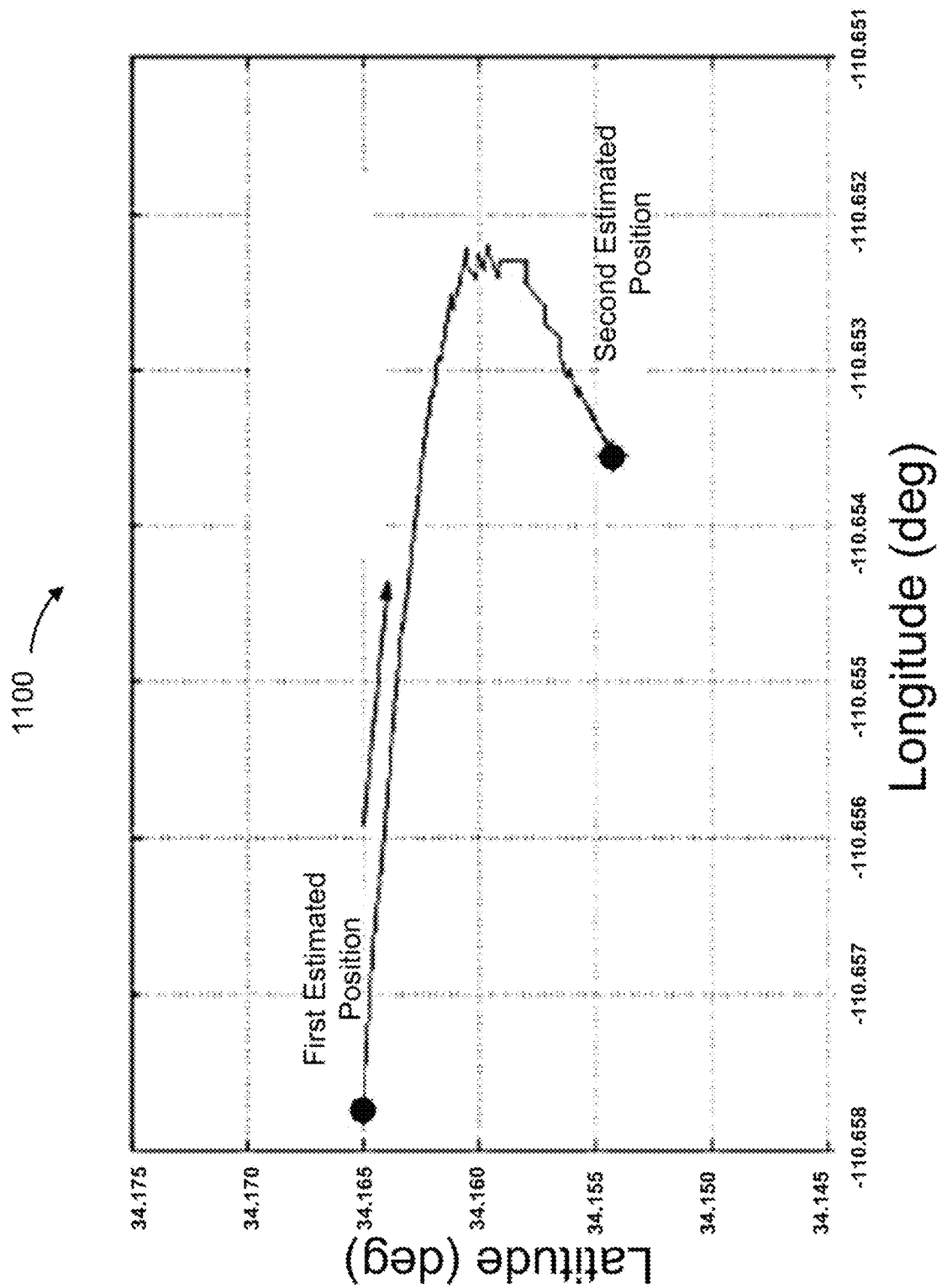
FIG. 11 depicts position tracking of a mobile receiver unit from an initial estimated position to a final estimated position

FIG. 10 is a block diagram of a mobile receiver unit 1000, in accordance with an exemplary implementation of the disclosed technology. In certain exemplary implementations, the components may be located both at a reference station (such as reference station 804 of FIG. 8) and at mobile receivers (such as the mobile receiver 808 of FIG. 8).

As depicted, an antenna is connected to a dedicated chain of receiver components that are configured to process the received signals. For example, an antenna receives the broadcast signals from all of the plurality of broadcast transmitters (referred to in FIG. 8 as transmitters 802) simultaneously. As depicted, the signals are then transmitted to an analog-digital converter 3-1. The analog-digital converter 3-1 can sample the input analog spectrum and output a digitized signal that can be further processed by the system. For example, in some embodiments, the analog-digital converter 3-1 samples the input analog spectrum centered at nominally 1.105 MHz using a 16-bit analog-to-digital converter and outputs a composite sampled data rate of approximately 20 MS/sec.

As further depicted, the digitized signals are then transmitted to a down sampler 3-2. The down-sampler 3-2 down samples and reformats the above composite data into a standard data format. For example, in an example, down-sampler 3-2 can sample and reformat the data into an approximate 1.2 MS/see data rate in IQ (in-phase and quadrature phase) format. As will be appreciated, this rate represents the medium-wave spectrum centered at 1,105 kHz+−600 kHz containing the channelized center frequencies 510 kHz, . . . , 520 kHz, . . . , 1700 kHz in conformity with the U.S. Federal Communications Commission approved band plan.

As will be appreciated, in any given area in the U.S. many of these sub-bands will be occupied but only in the largest metropolitan markets will all sub-bands be occupied. Because the U.S. medium-wave broadcast band is channelized on 10 kHz centers, it is possible that in any given area two broadcasts can be received at 10 or 20 kHz separation and therefore fall within the same sub-band. This rarely occurs, however, because the FCC frequency assignment procedures take care to ensure minimal adjacent channel interference. If interference within a sub-band does occur causing signal degradation, the interference is detected and that sub-band can be removed from service automatically.

The channelizer-selector module 3-3 de-multiplexes the sampled signal into parallel data streams to allow for multiple streams of processing. For example, the channelizer-selector module 3-3 de-multiplexes the sampled signal above 1.2 MS/sec composite data stream into sixty parallel data stream outputs each occupying +−10 kHz in bandwidth. In some examples, the sixty parallel channels can represent medium-wave broadcast sub-bands at 505-525 kHz, . . . 525-545, . . . 1685-1705 kHz.

In some examples, channelizer-selector module 3-3 can be configured to allow any 24 of the 60 parallel data streams to be routed to any of 24 individual output paths connected to signal parsing loops module 3-4. For example, the output paths can connect to 20 signal samples 3-4 plus optionally 4 data demodulators (not depicted) in the event that the system receives multiplexed reference unit data. Further, data stream routing instructions can be provided by the system manager, depicted as a software defined receiver, 3-5 that receives can receive instructions from an internal real-time microprocessor.

Each broadcast 3-4 can record signal samples and can measure an instantaneous Broadcast timestamp. Because the ADC module 3-1 converted the broadcast signals to digital form with 16-bit resolution, the signals may be measured with the same resolution. Generally, most areas of the U.S. have at least 20 medium-wave broadcast signals operating at any time. They can be selected and applied individually to the signal sampling 3-4 in parallel for simultaneous data comparison.

In some examples, the data demodulators can receive the multiplexed data streams originated by reference stations 804 in FIG. 8, some of which may be located in overlapping broadcast coverage areas, through the reconfigurable selector 3-3. In some examples, up to four data streams can be received simultaneously. As will be appreciated, such an example allows a mobile unit to move between coverage regions while maintaining uninterrupted reception of reference unit signals.

The real-time microprocessor in the system manager 3-5 can be configured to operate in two modes: acquisition (or first-fix) mode and tracking mode. Each mode will be discussed further below.

At power-on time, Module 3-5 can be configured to "wake up" and perform initial "first fix" coarse positioning by scanning the local broadcast band(s), and comparing the active frequencies to an on-board almanac of published and surveyed broadcast towers. In some examples, the system can be configured to select the strongest such signal if more than one is detected. Once the signal is selected, the database lookup returns the geographic coordinates of the registered broadcast tower location. In some examples, the system can be configured with an alternate method for obtaining a "first fix" based on utilized cellular data. For example, the system can be configured to utilize a cellular radio to find the nearest cell tower, obtaining its tower ID, and retrieving location coordinates from aforementioned on-board database.

Additionally, in some examples, the system can be configured to transmit via a backchannel in the AM band. In such an example, the receiver can be configured to scan the AM band looking for the specified channel. Once the channel is located, the receiver can be configured to receive location data.

Upon completion of the coarse positioning process, Module 3-5 can be configured to transition the acquisition mode to a background process and initializes tracking mode as a foreground process. Upon initialization of tracking mode, the current signals of up to 20 broadcast signal samples are obtained by the signal sample loops 3-4 and recorded as the initialization signal. Then at configurable time intervals, incremental changes in the signal samples are measured and the corresponding change in position at each interval is calculated. In some examples, the system can also be configured, at selected time intervals, to determine the displacement between the current and prior positions and to generate a velocity and heading.

Further during tracking mode, the system can be configured to monitor the noise and signal strength from each signal sample in 3-4 in order to estimate the signal quality. The determined signal-to-noise ratio can be used as a measure of the quality of that broadcast signal for signal sampling purposes. In some examples, Module 3-5 can be configured to approximately rank the broadcast signals selected by Module 3-3 based on such signal quality metrics. In such an example, the system can be further configured to perform signal sample measurements only on the broadcast signals that meet a minimum signal quality requirement.

Module 3-5 operates almost identically in reference station 804 and mobile unit 808 applications. When operating as part of a reference unit 804, Module 3-5 is the source of the telemetered data that is optionally multiplexed onto a broadcast signal and received by mobile unit 1-2. As stated previously the reference station telemetered data consists of calculated signal sample times of arrival as of their transmission points, measured signal travel distances, time reference synchronization marks, and the location of the reference station itself. Further in some examples, the reference station data can include a snapshot of the captured spectrum, the time of the snapshot, a continuous almanac of the reference station location, the transmitter locations, and their measured frequencies.

As further depicted, Module 3-6 optionally connects to a user display screen and user input keyboard for allowing the user to configure the operation of the invention as needed and for viewing the position, velocity and bearing results of the calculations performed by Module 3-5.

Figure 12:
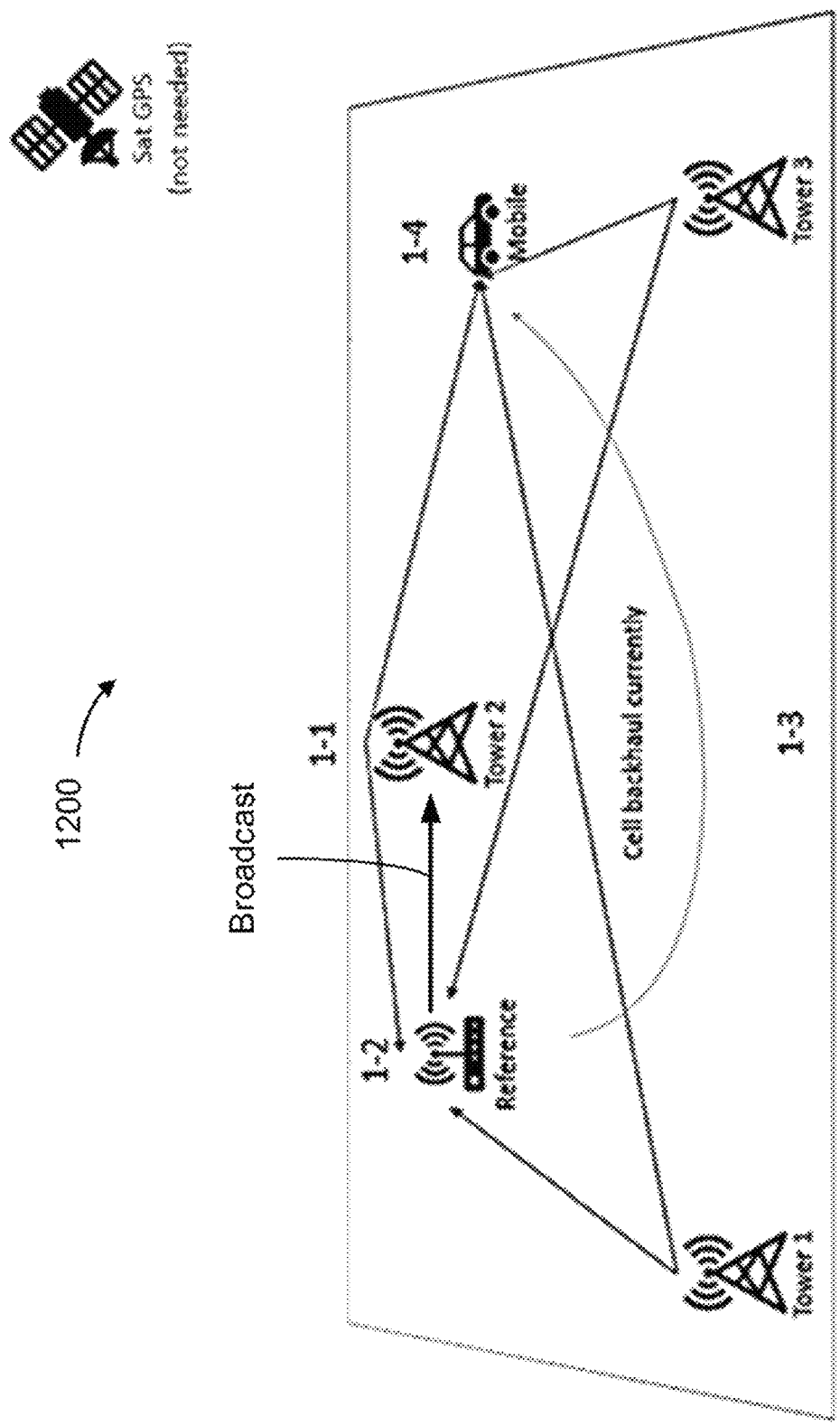
FIG. 12 depicts a small area on the earth's surface containing multiple standard radio or TV broadcast transmitter towers and a mobile receiver unit representing the disclosed technology, where the reference unit is configured to broadcast information to nearby towers.

FIG. 12 depicts a small area on the earth's surface containing an example system 1200 further described herein. As depicted, the system includes multiple standard radio or TV broadcast transmitters 1-1, a reference station/unit 1-2, and a remote receiver/unit 1-4, according to the disclosed technology. The transmitters 1-1 may correspond with the transmitters 102 and 804, as shown and discussed with reference to FIGS. 1 and 8. Similarly, the reference station 1-2 may correspond to reference station 102 and 804 and mobile receiver 1-4 may correspond to the remote receiver 108 and 808 as shown and discussed with reference to FIGS. 1 and 8.

In some examples, the snapshot of the signals in the spectrum received at the remote unit 1-4 is compared with the signal information provided by the reference station 1-2 through one of the methods described herein. The entire sampled signal content from each station (e.g., 1-2) is used in the comparison and the precision if the comparison may be enhanced through an interpolation algorithm. For example, the snapshot taken at the remote unit 1-4 for a station A (e.g., 1-1) will differ in time from the snapshot taken at the reference unit 1-2 by an amount defined as:

$$T_{Arr} = T_{Arem} - T_{Aref} + T_E \quad (1)$$

Where:
$T_{Arr}$=measured difference between the times of arrival of signal from station A 1-1 to the remote unit 1-4 and the reference unit 1-2.
$T_{Arem}$=propagation time of signals from station A 1-1 to the remote unit 1-4.
$T_{Aref}$=propagation time of signals from station A 1-1 to the reference unit 1-2.
$T_E$=the timing error of the remote unit's 1-4 clock.

In some examples, all of the processing steps described below are carried out at the remote unit 1-4. As will be appreciated, portions of the relevant processing may be moved to other units (e.g., reference unit 1-2) and data may be subsequently transmitted.

Upon initialization, the system 1200 can be configured to measure the $T_{Xrr}$ (X is the station letter) for the stations (e.g., 1-1) available in the service area by comparing the signal snapshots taken at the remote unit 1-4 with the spectral information from the reference unit 1-2. The remote unit 1-4 can also be configured to calculate the propagation time of each station 1-1 to the reference unit 1-2, $T_{Xref}$, based on the positions of the reference unit 1-2 and each station 1-1 provided by the reference unit's 1-2 broadcast almanac. As will be appreciated, propagation time calculations use a spherical earth model.

Once initialized, the system 1200 can be configured to be initialized with an estimate of the position of the remote unit 1-4. This may be initialized to any position in the service area when the remote unit 1-4 is started. Subsequent position determination can be configured to utilize last position determined by the system 1200. Based on the estimated position, bearings to each of the stations 1-1 can be calculated, using the spherical earth model. For example, a bearing unit vector, ($ux_X$, $uy_X$) can be calculated for each station 1-1, where ux is the sine of the bearing and uy is the cosine of the bearing.

Based on the estimated position, pairs of stations 1-1 can be chosen such that their bearings from the estimated position are separated by as large an angle as possible. The difference in unit vectors, ($ux_{XY}$, $uy_{XX}$), can be calculated for each of the station pairs. This is a bearing unit vector corresponding to the direction of maximum change in difference in time of arrival per unit distance for the station pairs. Based on the estimated position, the estimated propagation times to the remote unit 1-4, $T_{Xremest}$, can be calculated for each of the stations in the pair using the spherical earth model.

Based on the values calculated above, an estimated difference, $T_{XY}$, of times of arrival for the two stations can be calculated. For example, if the pair is for stations A and D:

$$T_{AD}=T_{Aremest}-T_{Dremest}+T_{Aref}-T_{Dref} \quad (2)$$

The differences can be taken between the measured times of arrival, $T_{Xrr}$, for the two stations in the pair, cancelling the clock error term, $T_E$, forming $T_{XYmeas}$. The error between the measured and estimated times of arrival is calculated:

$$T_{errXY}=T_{XYmeas}-T_{XY} \quad (3)$$

A system of equations can be generated based on all the possible, useful station pairs such that:

$$T_{errXY}v_p=ux_{XY}\Delta x+uy_{XY}\Delta y \quad (4)$$

where $v_p$ is the velocity of propagation.

This station usually will be over-determined. A solution is calculated with the equations weighted based on signal strength. Other criteria for weighting may be used.

The solution produces $(\Delta x, \Delta y)$, which is a correction vector to an improved estimate of the remote unit's 1-4 position. This vector can be used to correct the current estimate of the location to a new estimate. This new estimate is then used to iterate the process described above until the magnitude of the correction vector is less than a predetermined measure of precision (e.g., 1 meter). Accordingly, once the magnitude of the correction vector is less the chosen measure of precision, the remote unit's 1-4 position has been determined. As will be appreciated, in such an example, the convergence is rapid and stable.

Based on the determined position, $T_{Xrem}$ is calculated for each of the stations 1-1. Equation 1 can be manipulated to:

$$T_E=T_{Xrem}-T_{Xref}+T_{Xrr} \quad (5)$$

The values of $T_E$ for each station 1-1 are combined into a weighted average, which is the timing error of the remote unit's 1-4 clock. This value may be used to discipline the remote unit's 1-4 clock to transfer time from the reference unit's 1-2 clock.

The system can be configured to repeat the previously described steps with a new measurement of the $T_{Xrr}$ values to determine a new position and timing error.

Further, and as will be appreciated in light of the following discussion, system 1200 can be configured to make position determination based upon time of arrival and time difference of arrival calculations performed by one or more system component.

The following describes a high-level description of reference unit 1-2 and remote unit 1-4 functionality:
Reference Unit 1-2:
Receive AM/FM signals from at least 3 nearest broadcast towers
  a. Convert analog signal to digital for processing
  b. Create signal samples at defined time intervals
  c. Sends timing and location information to web server
Remote Unite 1-4:
  a. Receive AM/FM signals from at least 3 nearest broadcast towers
  b. Convert analog signals to digital for processing
  d. Retrieve Reference Unit signal samples from web server (HTTP queries)
  e. Compare remote digital signal samples to Reference Unit samples
  f. Calculate geographic position (latitude, longitude, etc.) and timing corrections Because the exact location of the reference device 1-2 and the broadcast towers 1-1 are known, the unknown location of the remote device 1-4 can be determined using time of arrival ("TOA") or time difference of arrival ("TDOA") calculations.

By knowing the time difference "tx" between two towers "1" and "2" relative to the Reference device "0", we can calculate the distances "Δ1" and "Δ2" by multiplying by the speed of light "c":

$$\Delta_n=t_n*c$$

where "n" is the number of the tower.

For a source located at point (x, y) and towers located at $(x_n, y_n)$, the TDOA calculations are as follows:

$$r_0^2=(x-x_0)^2+(y-y_0)^2$$

$$r_1^2=(x-x_1)^2+(y-y_1)^2$$

$$r_2^2=(x-x_2)^2+(y-y_2)^2$$

"r1" and "r2" can be substituted in the above equation by $$R_1=r_0+\Delta_1$$

$$R_2=r_0+\Delta_2$$

To give:

$$(r_0+\Delta_1)^2=(x-x_1)^2+(y-y_1)^2$$

$$(r_0+\Delta_2)^2=(x-x_2)^2+(y-y_2)^2$$

Figure 13:
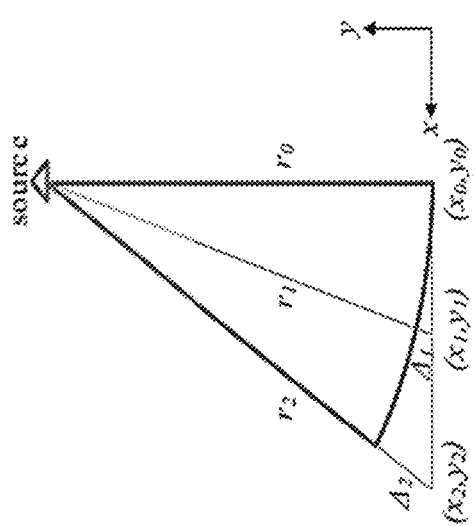
FIG. 13 depicts sound wave propagation toward two objects.
Figure 14:
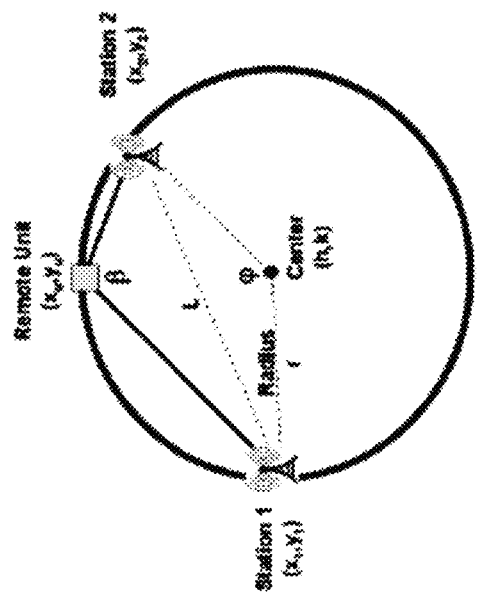
FIG. 14 depicts a geometry associated with the mobile receiver unit taking measurements simultaneously from two stations, and the associated process of finding the radius of the desired circle.

FIG. 13 depicts an annotated depiction of radio wave propagation towards two objects. As will be appreciated, by taking simultaneous measurements between two stations at the remote unit 1-4, the distance between the stations can be determined. As further depicted in FIG. 14, such calculated distance can be utilized to calculate radius of an intersecting circle via the following calculations:

$$L=\sqrt{(x_1-x_1)^2+(y_2-y_1)^2}$$

$$\varphi=2\beta \text{ or } \varphi=2(\pi-\beta)$$

$$r=\frac{L}{2\sin\left(\frac{\varphi}{2}\right)}$$

In FIG. 7, if L is the distance between the stations, the central angle of the circle is either 2β or 2(π-β) depending on whether the mobile receiver unit is in the large part of the circle (β<=π/2) or in the small part of the circle (β>=π/2) relative to L respectively. The radius r of the circle is a function of L and φ as shown below:

$$r=\frac{L}{2\sin(\beta)} \text{ or } r=\frac{L}{2\sin(\pi-\beta)}$$

Figure 15:
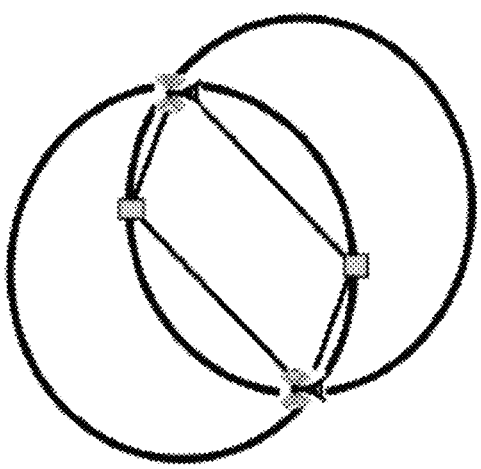
FIG. 15 depicts two candidate mirror-image circle solutions that could satisfy the known parameters for connecting the two stations, as shown in FIG. 14, according to certain exemplary implementations of the disclosed technology.

Once the radius is determined, the system can identify mirror image circles that could be solutions (e.g., include all of the receivers thus allowing for the calculation of the unknown location). FIG. 15 depicts an example of two such candidate solutions. The centers (h,k) of these circles can be determined by the locations of the two stations (x1,y1) and (x2,y2) together with the radius r and the distance L.

$$h = \frac{x_1 + x_2}{2} \pm \frac{y_1 - y_2}{L}\sqrt{r^2 - \frac{L^2}{4}}$$

$$k = \frac{x_1 + x_2}{2} \pm \frac{x_2 - x_1}{L}\sqrt{r^2 - \frac{L^2}{4}}$$

Figure 16:
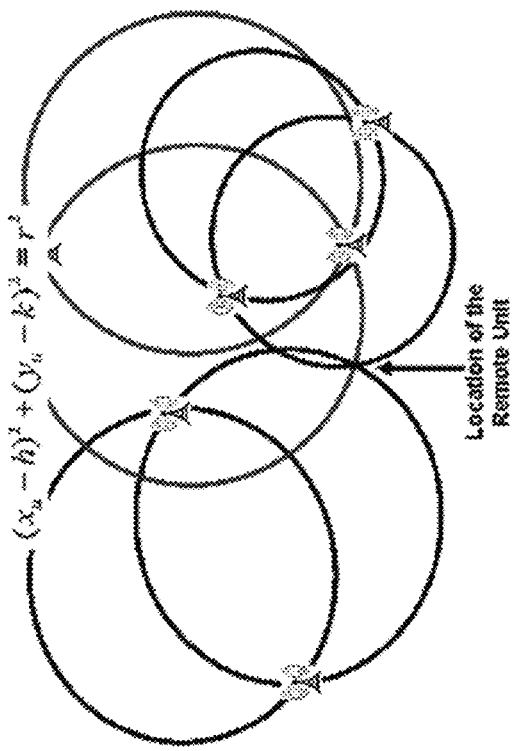
FIG. 16 depicts a system of circles connecting the two stations as depicted in in FIG. 14 and the intersection that defines the mobile/remote receiver unit position, according to certain exemplary implementations of the disclosed technology.

As depicted in FIG. 16, the equations for the two circles can be written in terms of the location of the mobile receiver unit at $(x_u, y_u)$. With more stations, the exact position of the mobile receiver unit can be determined by solving for the intersections of these circles.

Because of reflections and the fact that the relative receptions position is unknown, each pair of stations includes 8 possible circular solutions. In some examples, the system can be configured to implement the following method to determine the final position:

a. For every pair of circles from different stations, solve the equations simultaneously to get 0, 1, or 2 intersection points.
b. For every pair of intersection points, calculate the distance between them.
c. Order the pairs by shortest distance first.
d. Filter the results to determine the closest points. As will be appreciated, the top points should be very close with the rest farther away. Then average the remaining x and y coordinates to determine a final position.

Figure 17:
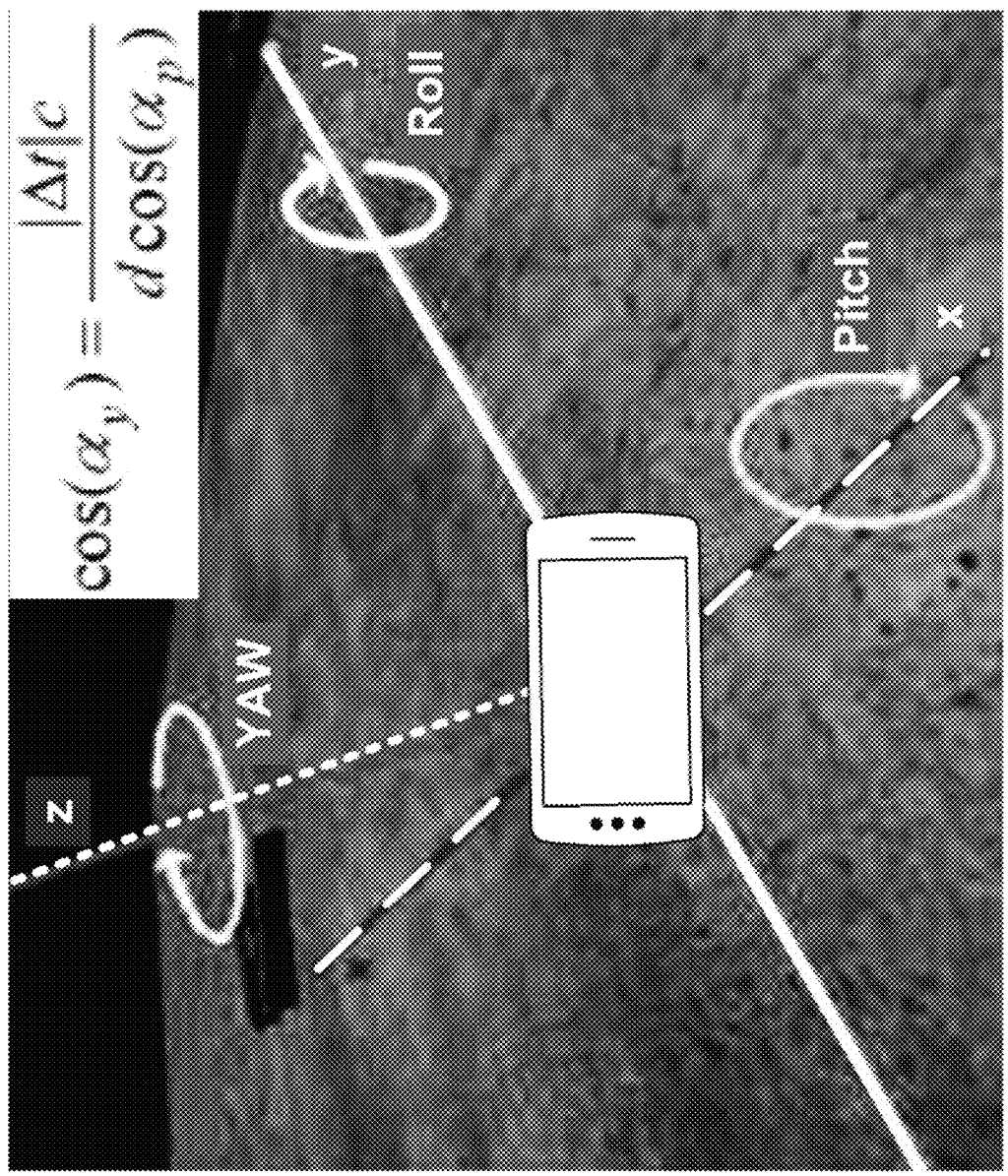
FIG. 17 depicts yaw, roll, and pitch of an inertial measurement unit, according to certain exemplary implementations of the disclosed technology.
Figure 18:
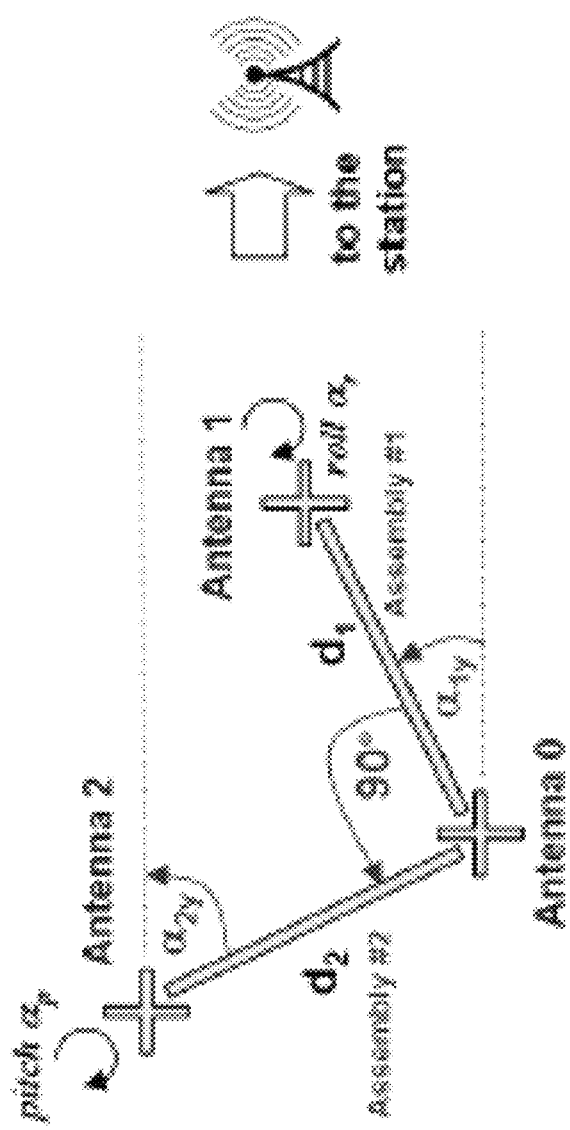
FIG. 18 depicts a schematic for altitude measurement, according to certain exemplary implementations of the disclosed technology.
Figure 19:
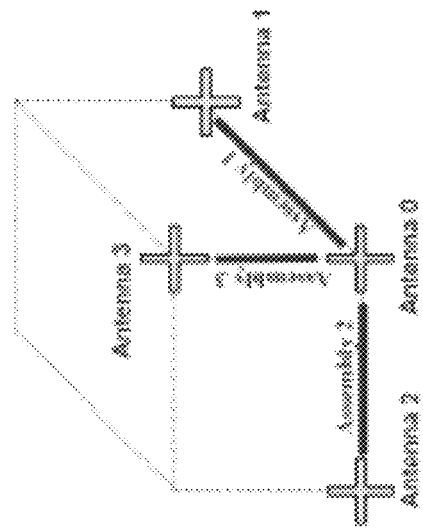
FIG. 19 depicts a schematic for practical altitude measurement, according to certain exemplary implementations of the disclosed technology.
Figure 19:
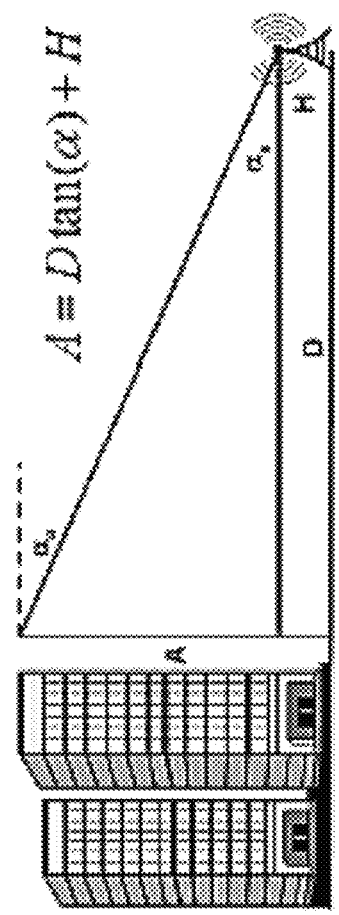

FIGS. 17-19 depict various implementations of the disclosed technology configured to add in an altitude determination to the previously described position determination. FIG. 17 depicts an inertial measurement unit ("IMU"). In some examples, the systems described herein may include an IMU configured to supply real-time data indicative of changes in assembly orientation for the pitch angle $\alpha_p$. When the unit's pitch is vertical, $\alpha_p = \pi/2$ and $\cos(\alpha_p) = 0$. In this case, there is no solution for the yaw angle $\alpha_y$ since when two antennas are oriented vertically they measure equal distances from every direction.

$$\cos(\alpha_y) = \frac{|\Delta t|c}{d\cos(\alpha_p)}$$

FIGS. 18 and 19 depicts a schematic for altitude measurement. Altitude of the mobile device can be determined with an embedded altimeter as long as it has been able to calibrate itself based on validation of known locations. In the event the altimeter cannot be calibrated the mobile device reverts to calculating altitude based on received signals. A third orthogonal antenna depicted in FIGS. 18 and 19 can be utilized required to determine altitude in addition to the IMU sensor which can provide orientation data simultaneously for all three axes. The roll angle $\alpha_r$ now becomes important. If the two antenna assemblies are parallel to the ground, the relative angle between them as measured by a station is 90o regardless of the twist (yaw). However, if the entire assembly is elevated, this relative angle changes. These angle relationships can be used to find the altitude given the position.

For example, assume that antennas 0 and 1 on assembly #1 are used to determine the yaw angle $\alpha 1y(s)$ to the station for positioning. Antennas 0 and 2 on assembly #2 are used to determine the altitude A. The pitch angle $\alpha$ p and the roll angle $\alpha$ r are given by the IMU. The following procedure can be used to find the position and altitude with three antennas:

a. For antenna assemblies #1 and #2, calculate the yaw angles à1y(s) and à2y(s) to each station s removing the orientation angles $\alpha$ p and $\alpha$ r respectively.

$$\cos(\alpha_{1y}(s)) = \frac{|\Delta t_1(s)|c}{d_1 \cos(\alpha_p)} \quad \cos(\alpha_{2y}(s)) = \frac{|\Delta t_2(s)|c}{d_2 \cos(\alpha_r)}$$

b. Compare the two yaw angles to $\pi/2$ and determine the altitude angle àa(s).

$$\cos(\alpha_a(s)) = \frac{\alpha_{1y} + \alpha_{2y}}{\pi/2}$$

c. Recalculate the yaw angle à1y(s) and remove both the pitch and the altitude angles.

$$\cos(\alpha_{1y}(s)) = \frac{|\Delta t_1(s)|c}{d_1 \cos((\alpha_p + \alpha_a(s)) \bmod \pi/2)}$$

d. Repeat the above three steps with other stations and calculate the unit position (xu,yu). Determine the altitude A using the distance to each station s at (xs,ys) with the tangent of its altitude angle. Add the transmitting tower height H(s) and average the altitudes over N stations.

$$A(s) = \tan(\alpha_a(s))\sqrt{(x_u - x_s)^2 + (y_u - y_s)^2} + H(s) \quad \hat{A} = \left(\sum_{s=1}^{N} A(s)\right)/N$$

What has been described is a new and improved system for a system for accurate geospatial location using radio transmissions without satellite signals, overcoming the limitations and disadvantages inherent in the related art.

Although the disclosed technology has been described with a degree of particularity, it is understood that the present disclosure has been made by way of example and that other versions are possible. As various changes could be made in the above description without departing from the scope of the disclosed technology, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

All dimensions specified in this disclosure are by way of example only and are not intended to be limiting. Further, the proportions shown in these figures are not necessarily to scale. As will be understood by those with skill in the art with reference to this disclosure, the actual dimensions and proportions of any system, any device or part of a system or device disclosed in this disclosure will be determined by its intended use.

Throughout the drawings, reference numbers are re-used to indicate correspondence between referenced elements. In addition, the first digit of each reference number indicates the FIG. where the element first appears.

As used in this disclosure, except where the context requires otherwise, the term "comprise" and variations of the term, such as "comprising", "comprises" and "comprised" are not intended to exclude other additives, components, integers or steps.

Specific details are disclosed to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Certain embodiments are described herein as a process that is depicted as a flowchart, a flow diagram, a structure diagram, or a block diagram. The flowcharts and block diagrams in the figures can illustrate the architecture, functionality, and operation of possible implementations of systems, methods, and computer programs according to various embodiments disclosed. In this regard, each block in the flowchart or block diagrams can represent a module, segment, or portion of code, that can comprise one or more executable instructions for implementing the specified logical function(s). It should also be noted that, in some alternative implementations, the functions noted in the blocks may occur out of the order noted in the figures. Although a flowchart may describe the operations as a sequential process, many of the operations can be performed in parallel or concurrently. In addition, the order of the operations may be rearranged. A process may be terminated when its operations are completed. A process may correspond to a method, a function, a procedure, a subroutine, a subprogram, etc. When a process corresponds to a function, its termination corresponds to a return of the function to the calling function or the main function. Additionally, each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc. and are also referred to as an interface, where the interface is the point of interaction with software, or computer hardware, or with peripheral devices.

Certain terminology is used herein to describe certain features of one or more embodiments of the disclosed technology. It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

What is claimed is:

1. A positioning and timing system comprising:
   a plurality of transmitters each located at different corresponding positions, each transmitter of the plurality of transmitters is configured to output transmission signals uncoordinated with signals transmitted by other transmitters of the plurality of transmitters, each of the transmission signals characterized by corresponding carrier frequencies that differ from the frequency is signals transmitted by the other transmitters of the plurality of transmitters;
   a reference receiver unit located at a reference position that differs from each the corresponding positions of the plurality of transmitters;
   at least one processor in communication with the reference receiver unit;
   a database in communication with the at least one processor;
   wherein the reference receiver unit is configured to:
      receive transmitter signals transmitted by the plurality of transmitters;
      sample the transmitter signals;
      generate, using the at least one processor, time references for each of the received transmitter signals;
      store in the database, location information comprising locations of each of the plurality of transmitters; and
      broadcast the sampled transmitter signals, time references, and location information;
   a remote receiver unit located at an unknown position, the remote receiver including an inertial measurement unit and configured to:
      receive transmitter signals transmitted by the plurality of transmitters;

receive, from the reference unit, the broadcast sampled transmitter signals, time references, and location information; and compute the position of the remote receiver unit and the error of its clock relative to the reference unit clock based on the comparison of the broadcast samples corresponding to the time references.

2. The positioning and timing system of claim 1, wherein plurality of transmitters comprise a plurality of cell towers, and wherein the remote receiver unit comprises a wireless cellular radio receiver configured to receive cell tower signals in the vicinity.

3. The positioning and timing system of claim 2, wherein the remote receiver unit is configured to select two or more strongest signals from cell towers in the vicinity.

4. The positioning and timing system of claim 1, wherein computing the position of the remote receiver unit based on the comparison of the broadcast samples corresponding to the time references includes determining the latitude and longitude of the remote receiver unit.

5. The positioning and timing system of claim 4, wherein computing the position of the remote receiver unit further includes determining, based at least in part on data generated by the inertial measurement unit, the altitude of the remote receiver unit.

6. The positioning and timing system of claim 1, wherein the said broadcast sampled transmitter signals, time references, and location information are broadcast by means of a data channel carried over one or more of the said transmitter signals.

7. A positioning and timing system comprising:
a reference receiver unit located at a known reference position that, the reference receiving being configured to:
receive transmitter signals transmitted by a plurality of transmitters, each transmitter having a fixed position;
sample the transmitter signals;
generate, using the at least one processor, time references for each of the received transmitter signals;
store in the database, location information comprising locations of each of the plurality of transmitters;
broadcast the sampled transmitter signals, time references, and location information;
a remote receiver unit located at an unknown position, the remote receiver including an inertial measurement unit and configured to:
receive transmitter signals transmitted by the plurality of transmitters;
receive, from the reference unit, the broadcast sampled transmitter signals, time references, and location information; and
compute the position of the remote receiver unit and the error of its clock relative to the reference unit clock based on the comparison of the broadcast samples corresponding to the time references.

8. The positioning and timing system of claim 7, wherein plurality of transmitters comprise a plurality of cell towers, and wherein the remote receiver unit comprises a wireless cellular radio receiver configured to receive cell tower signals in the vicinity.

9. The positioning and timing system of claim 8, wherein the remote receiver unit is configured to select two or more strongest signals from cell towers in the vicinity.

10. The positioning and timing system of claim 7, wherein computing the position of the remote receiver unit based on the comparison of the broadcast samples corresponding to the time references includes determining the latitude and longitude of the remote receiver unit.

11. The positioning and timing system of claim 10, wherein computing the position of the remote receiver unit further includes determining, based at least in part on data generated by the inertial measurement unit, the altitude of the remote receiver unit.

12. The positioning and timing system of claim 7, wherein the said broadcast sampled transmitter signals, time references, and location information are broadcast by means of a data channel carried over one or more of the said transmitter signals.

13. A positioning and timing device comprising:
a receiver unit located at an unknown position, the receiver unit including an inertial measurement unit and configured to:
receive transmitter signals transmitted by the plurality of transmitters, the plurality of transmitters each having a respective position;
receive, from a reference unit having a known position, reference unit sampled transmitter signals, time references, and corresponding surveyed positions of one or more of the plurality of transmitters; and
compute the position of the receiver unit based on the comparison of the reference unit sampled transmitter signals corresponding to the time references.

14. The positioning and timing device of claim 13, wherein plurality of transmitters comprise a plurality of cell towers, and wherein the remote receiver unit comprises a wireless cellular radio receiver configured to receive cell tower signals in the vicinity.

15. The positioning and timing device of claim 14, wherein the remote receiver unit is configured to select two or more strongest signals from cell towers in the vicinity.

16. The positioning and timing device of claim 13, wherein computing the position of the receiver unit based on the comparison of the reference unit sampled transmitter signals corresponding to the time references includes determining the latitude and longitude of the remote receiver unit.

17. The positioning and timing device of claim 13, wherein the said broadcast sampled transmitter signals, time references, and location information are broadcast by means of a data channel carried over one or more of the said transmitter signals.

18. The positioning and timing device of claim 13, wherein the transmitter signals transmitted by the plurality of transmitters comprise amplitude modulation ("AM") radio signals.

19. The positioning and timing device of claim 13, wherein device further includes a cellular receiver and wherein the device is configured to determine a position of the device based on received cellular data.

20. The positioning and timing device of claim 13, wherein compute the position of the receiver unit further includes determining, based at least in part on data generated by the inertial measurement unit, the altitude of the remote receiver unit.

* * * * *